United States Patent
Pang et al.

(10) Patent No.: US 9,633,441 B2
(45) Date of Patent: Apr. 25, 2017

(54) SYSTEMS AND METHODS FOR OBTAINING IMAGE DEPTH INFORMATION

(71) Applicant: OmniVision Technologies, Inc., Santa Clara, CA (US)

(72) Inventors: Chih Poh Pang, Pleasanton, CA (US); Haifeng Li, Sunnyvale, CA (US); Charles Shan, San Jose, CA (US); Tony Liu, San Jose, CA (US); Jizhang Shan, Cupertino, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 418 days.

(21) Appl. No.: 14/299,220

(22) Filed: Jun. 9, 2014

(65) Prior Publication Data

US 2015/0358597 A1    Dec. 10, 2015

(51) Int. Cl.
*H04N 13/00*    (2006.01)
*G06T 7/00*    (2006.01)
(Continued)

(52) U.S. Cl.
CPC ............ *G06T 7/0075* (2013.01); *G06T 5/009* (2013.01); *G06T 7/593* (2017.01);
(Continued)

(58) Field of Classification Search
CPC ........... H04N 13/0239; H04N 13/0431; H04N 13/0434; H04N 13/0271; H04N 13/0217;
(Continued)

(56) References Cited

U.S. PATENT DOCUMENTS 8,830,382 B2 *    9/2014    Hayasaka ............ H04N 5/2254 348/349
9,197,804 B1 *    11/2015    Or-Bach ............ H04N 5/23212
(Continued)

FOREIGN PATENT DOCUMENTS

TW    M410230 U1    8/2011
TW    201300930 A    1/2013

OTHER PUBLICATIONS

Translation of the first Office Action corresponding to Taiwanese Patent Application No. 104116293, mailed Oct. 4, 2016, 6 pages.

*Primary Examiner* — Sath V Perungavoor
*Assistant Examiner* — Howard D Brown, Jr.
(74) *Attorney, Agent, or Firm* — Lathrop & Gage LLP

(57) ABSTRACT

A system for obtaining image depth information for at least one object in a scene includes (a) an imaging objective having a first portion for forming a first optical image of the scene, and a second portion for forming a second optical image of the scene, the first portion being different from the second portion, (b) an image sensor for capturing the first and second optical images and generating respective first and second electronic images therefrom, and (c) a processing module for processing the first and second electronic images to determine the depth information. A method for obtaining image depth information for at least one object in a scene includes forming first and second images of the scene, using respective first and second portions of an imaging objective, on a single image sensor, and determining the depth information from a spatial shift between the first and second images.

16 Claims, 14 Drawing Sheets

(51) Int. Cl.
*G06T 5/00* (2006.01)
*H04N 13/02* (2006.01)
*G06T 7/593* (2017.01)

(52) U.S. Cl.
CPC ..... *H04N 13/0207* (2013.01); *H04N 13/0217* (2013.01); *H04N 13/0271* (2013.01); *G06T 2207/10012* (2013.01)

(58) Field of Classification Search
CPC .......... H04N 13/0207; H04N 13/0055; H04N 19/00769; H04N 13/0059; H04N 13/0048; G03B 35/00; G02B 27/2292; G06T 7/0075; G06T 5/009; G06T 2207/10012
See application file for complete search history.

(56) References Cited

U.S. PATENT DOCUMENTS

| | | | | |
|---|---|---|---|---|
| 2004/0207642 | A1* | 10/2004 | Crisu | G06T 11/203 345/626 |
| 2009/0046144 | A1* | 2/2009 | Tuttle | H01L 27/14685 348/61 |
| 2010/0253917 | A1* | 10/2010 | Gao | G02B 27/225 353/7 |
| 2012/0327195 | A1 | 12/2012 | Cheng | |
| 2013/0188026 | A1* | 7/2013 | Hiramoto | H04N 13/0235 348/49 |
| 2013/0215238 | A1* | 8/2013 | Yamazaki | H04N 13/0239 348/49 |
| 2014/0184748 | A1* | 7/2014 | Gharib | H04N 13/0246 348/46 |

* cited by examiner

SYSTEMS AND METHODS FOR OBTAINING IMAGE DEPTH INFORMATION

BACKGROUND

The use of imaging systems to obtain depth information about a scene is becoming increasingly widespread. Conventionally, such systems utilize stereo cameras that include two separate imaging systems to capture a pair of images of a scene. Each image in the image pair represents the scene as viewed from two different vantage points. This mimics how humans use a pair of eyes to achieve depth perception. A stereo camera may deduce the distance to an object in a scene from the relative displacement, between an image of the object captured by one of the separate imaging systems and an image of the object captured by the other one of the separate imaging systems. This process utilizes triangulation based upon the relative displacement, the distance between the two separate imaging systems, and focal properties of the imaging systems.

Stereo cameras are used, for example, as a safety feature in cars to determine the distance to nearby objects in order to avoid collision with these objects. Other applications include machine vision and three-dimensional photography.

SUMMARY

In an embodiment, a system for obtaining image depth information for at least one object in a scene includes (a) an imaging objective having a first portion for forming a first optical image of the scene, and a second portion for forming a second optical image of the scene, the first portion being different from the second portion, (b) an image sensor for capturing the first and second optical images and generating respective first and second electronic images therefrom, and (c) a processing module for processing the first and second electronic images to determine the depth information.

In an embodiment, a method for obtaining image depth information for at least one object in a scene includes forming first and second images of the scene, using respective first and second portions of an imaging objective, on a single image sensor, and determining the depth information from a spatial shift between the first and second images.

DETAILED DESCRIPTION OF THE EMBODIMENTS

Disclosed herein are systems and methods for obtaining image depth information using a single image sensor and a single imaging objective. The image sensor utilizes angularly selective pixels to selectively detect light originating from two different portions of the imaging objective. The image sensor thereby generates two images, each corresponding to a respective one of the two imaging objective portions. Depth information about a scene is obtained from spatial shifts of the image of scene between the two images generated by the image sensor. The presently disclosed systems and methods for obtaining image depth information may further by utilized, for example, to focus an imaging system by minimizing the spatial shift between the two images, or to provide a high-dynamic range image by combining the two images.

Figure 1:
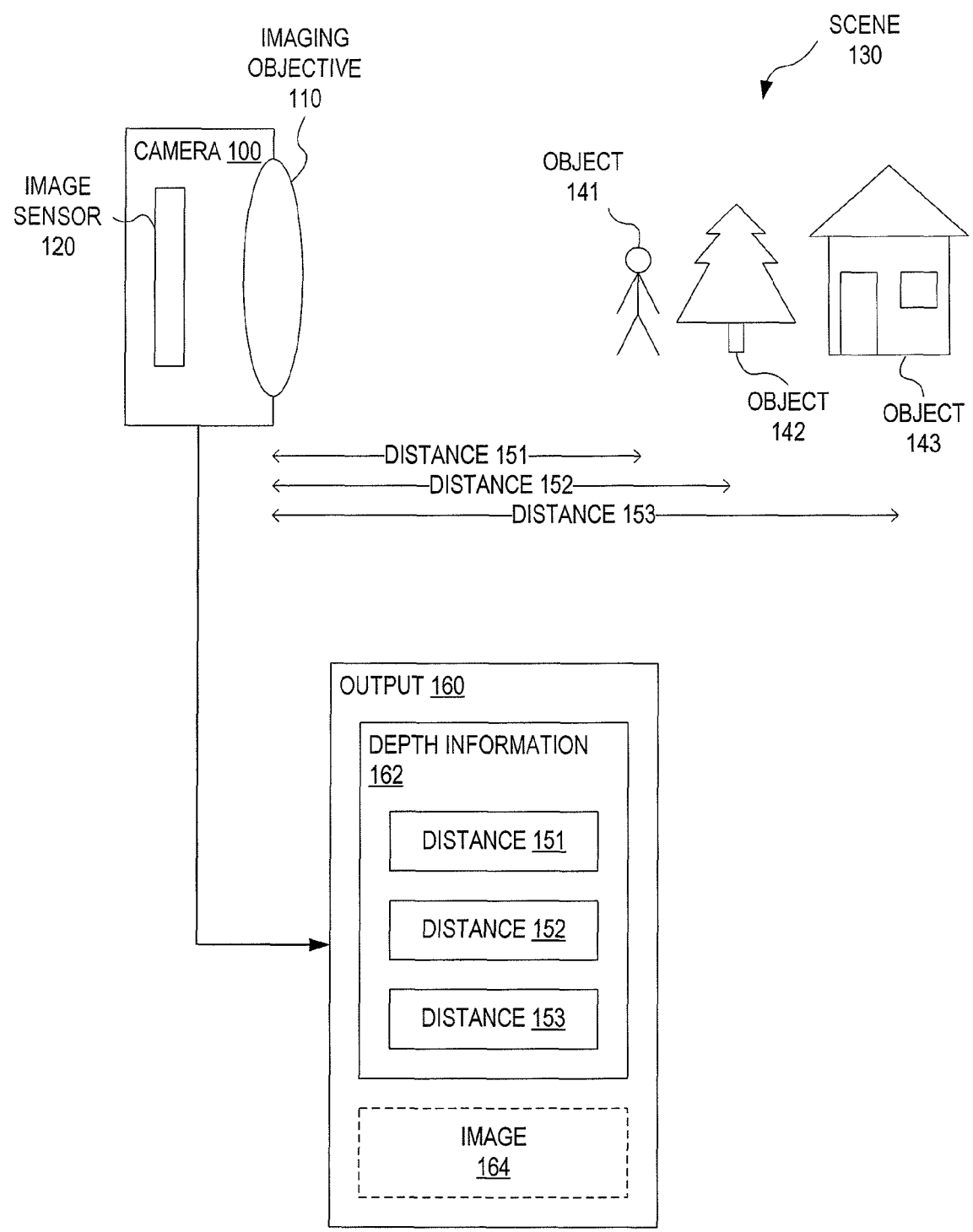
FIG. 1 illustrates an imaging system for obtaining image depth information about a scene, according to an embodiment.

FIG. 1 illustrates one exemplary imaging system, camera 100, for obtaining image depth information about a scene 130. Camera 100 includes an imaging objective 110 and an image sensor 120. Imaging objective 110 images scene 130 onto image sensor 120. In the exemplary scenario illustrated in FIG. 1, scene 130 includes an object 141 located at a distance 151 from camera 100, object 142 located at a distance 152 from camera 100, and object 143 located at a distance 153 from camera 100. Camera 100 may generate an output 160 including depth information 162 about scene 130. Depth information 162 includes distances 151, 152, and 153 determined by camera 100 by capturing and processing two images formed on image sensor 120 by two respective portions of imaging objective 110. Camera 100 may output distances 151, 152, and 153 as individual values pertaining to objects 141, 142, and 143. Alternatively, camera 100 may output a depth map of scene 130, or a portion thereof including objects 141, 142, and 143, which includes the distance from camera 100 to all points in scene 130 visible in the captured images of scene 130. Distances 151, 152, and 153 may be extracted from such a depth map. It is noteworthy that camera 100 determines absolute depth information about scene 130 using a single image sensor 120 and a single imaging objective 110. Optionally, output 160 further includes an image 164 of scene 130.

Figure 2A:
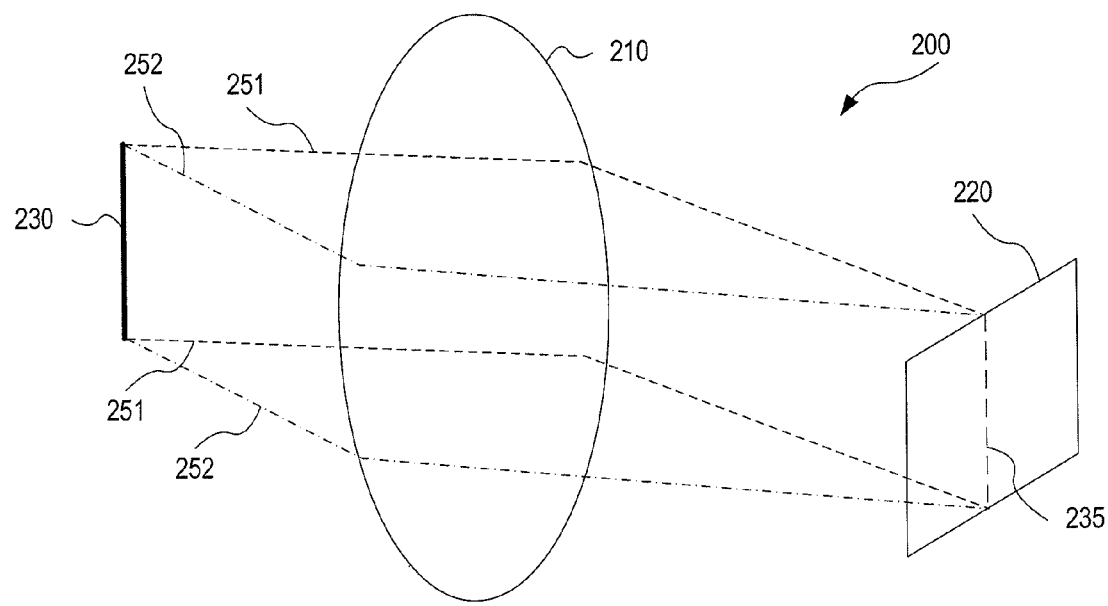
FIGS. 2A and 2B diagrammatically show, in perspective view and cross-sectional view, respectively, imaging of an object by an imaging system for obtaining image depth information, wherein the object is in focus, according to an embodiment.
Figure 2B:
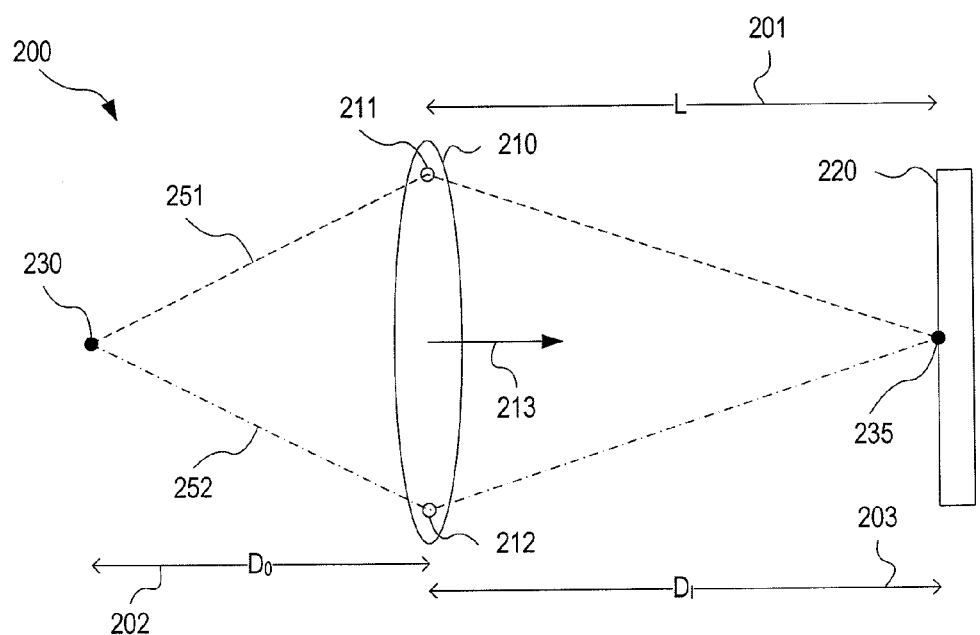

FIGS. 2A and 2B show a diagram 200 that illustrates imaging of an object by one exemplary imaging system for obtaining image depth information, when the object is in focus. FIG. 2A shows diagram 200 in perspective view, while FIG. 2B shows diagram 200 in cross-sectional view. FIGS. 2A and 2B are best view together. Exemplary portions 211 and 212 of an imaging objective 210 are located on opposite sides of the optical axis 213 of imaging objective 210. Portions 211 and 212 define two rays, or ray bundles, 251 and 252 propagating from an object 230 towards an image sensor 220. Rays 251 propagate from object 230 to image sensor 220 through portion 211 of imaging objective 210. Similarly, rays 252 propagate from object 230 to image sensor 220 through portion 212 of imaging objective 210. While FIGS. 2A and 2B illustrate object 230 as being located on optical axis 213, object 230 may be located away from optical axis 213, without departing from the scope hereof.

Imaging objective 210 has a focal length f. Assuming that imaging objective 210 is a thin lens, the thin lens equation dictates that $$\frac{1}{f} = \frac{1}{D_O} + \frac{1}{D_I}, \quad \text{(EQ. 1)}$$

where $D_O$ is the distance 202 from an object to imaging objective 210 and $D_I$ is the distance 203 from imaging objective 210 to a focused image of the object. In diagram 200, imaging objective 210 is at a distance 201, denoted L, from image sensor 220, where $L=D_I$. Therefore, object 230 is in focus of the imaging system formed by imaging objective 210 and image sensor 220, and the images formed on image sensor 220 by portions 211 and 212 coincide to yield a single image 235.

Figure 3A:
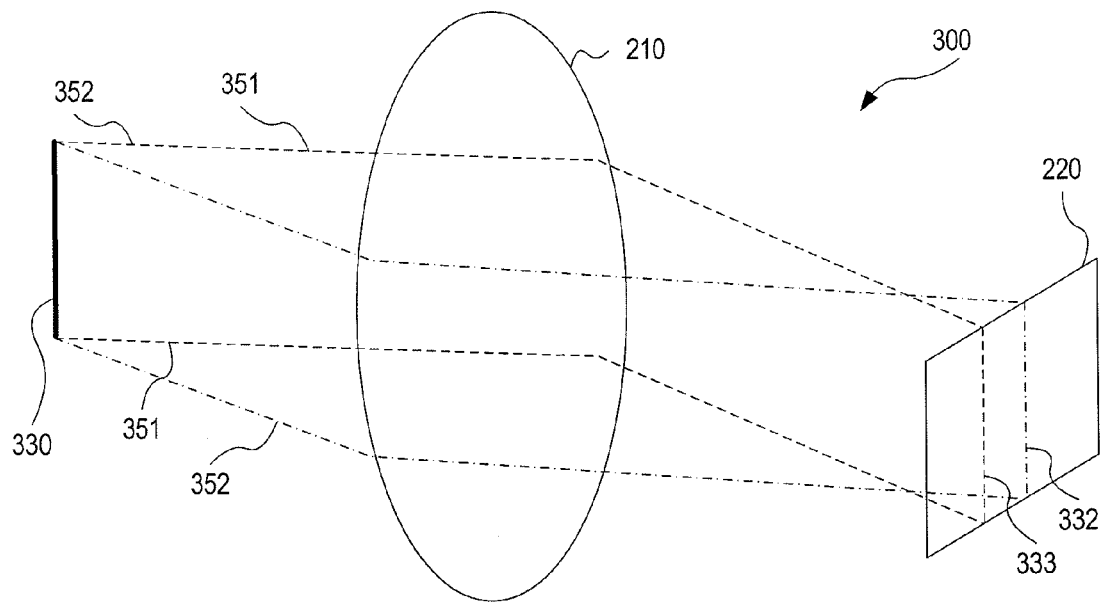
FIGS. 3A and 3B diagrammatically show, in perspective view and cross-sectional view, respectively, imaging of an object by an imaging system for obtaining image depth information, wherein the object is more distant from the imaging system than being in focus, according to an embodiment.
Figure 3B:
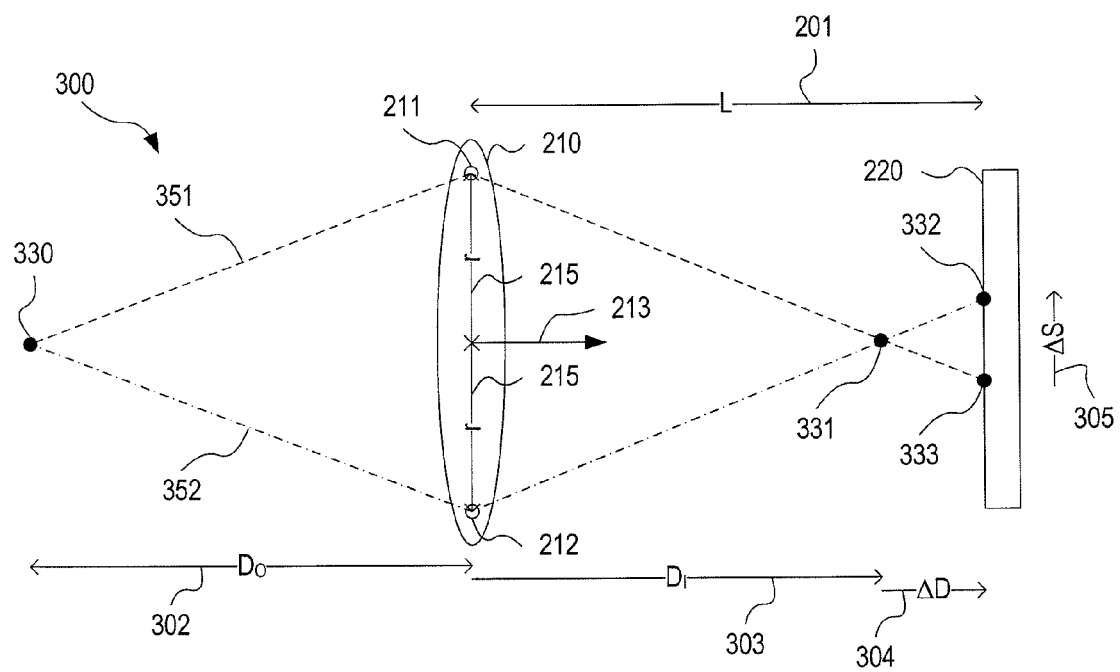

FIGS. 3A and 3B show a diagram 300 that illustrates imaging of an object 330 by the imaging system of FIGS. 2A and 2B, where object 330 is more distant than being in focus of the imaging system. FIG. 3A shows diagram 300 in perspective view, while FIG. 3B shows diagram 300 in cross-sectional view. FIGS. 3A and 3B are best view together. Object 330 is at a distance 302 from imaging objective 210 (FIGS. 2A and 2B), where distance 302 is greater than distance 202. While FIGS. 3A and 3B illustrate object 330 as being located on optical axis 213, object 330 may be located away from optical axis 213, without departing from the scope hereof. Rays 351 and 352 propagating from object 330 through imaging objective portions 211 and 212 (FIGS. 2A and 2B), respectively, to image sensor 220 (FIGS. 2A and 2B) intersect at a point 331. According to EQ. 1, since distance 302 ($D_O$) is greater than distance 202, distance 303 ($D_I$) is less than distance 203. Hence, point 331 is located between imaging objective 210 and image sensor 220 at a distance 304, denoted $\Delta D$, from image sensor 220. Consequently, as illustrated by rays 351 and 352, imaging objective portions 211 and 212 form respective images 332 and 333 on image sensor 220. Images 332 and 333 are apart from each other by a distance 305, denoted spatial shift $\Delta S$.

The spatial shift $\Delta S$, distance 305, is indicative of the distance 302 from object 330 to imaging objective 210 as expressed by the following equation:

$$D_O = \left[\frac{1}{f} - \frac{1}{L}\left(\frac{\Delta S}{2rL} + 1\right)\right]^{-1}, \quad \text{(EQ. 2)}$$

where r is the distance from optical axis 213 to either one of portions 211 and 212. EQ. 2 is derived from EQ. 1 using the geometrical relationship $$\frac{\Delta D}{\Delta S/2} = \frac{D_I}{r}. \quad \text{(EQ. 3)}$$

In the derivation of EQ. 2, it is assumed that portions 211 and 212 are equidistant from optical axis 213. Without departing from the scope hereof, portions 211 and 212 may be at differing distances from optical axis 213, and EQ. 2 is modified accordingly. In either case, EQ. 2 illustrates that the distance from object 330 to imaging objective 210 may be deduced from the spatial shift $\Delta S$ using known values of properties of the imaging system formed by imaging objective 210 and image sensor 220.

Figure 4A:
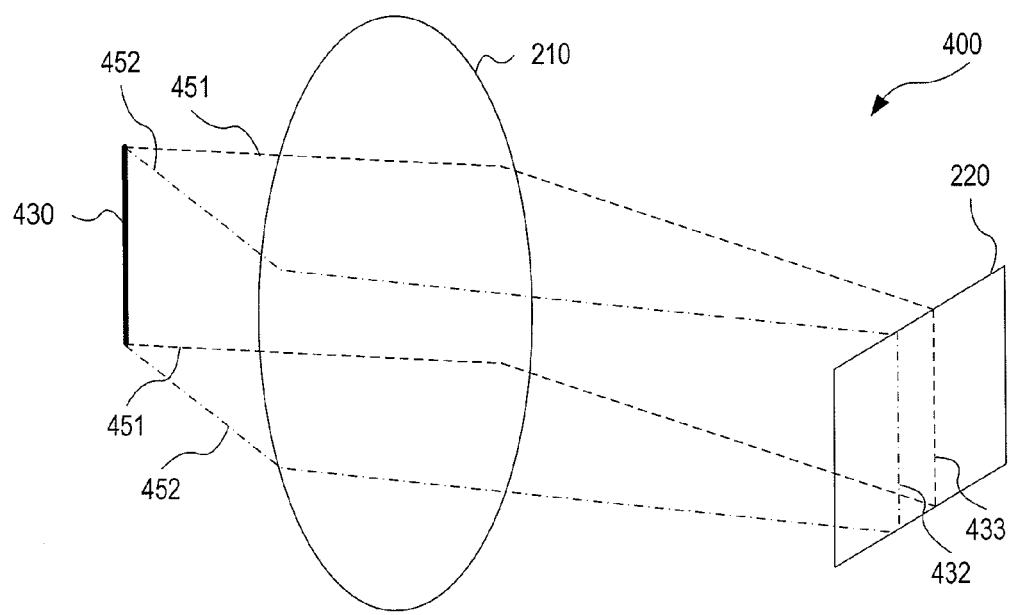
FIGS. 4A and 4B diagrammatically show, in perspective view and cross-sectional view, respectively, imaging of an object by an imaging system for obtaining image depth information, wherein the object is less than distant from the imaging system than being in focus, according to an embodiment.
Figure 4B:
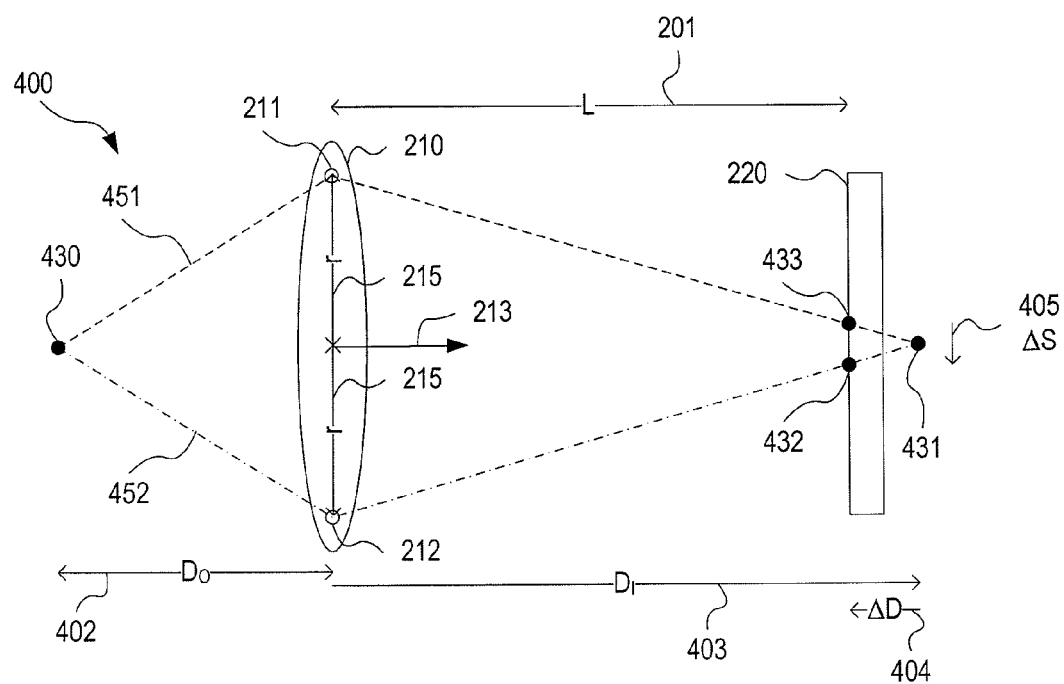

FIGS. 4A and 4B show a diagram 400 that illustrates imaging of an object 430 by the imaging system of FIGS. 2A and 2B, where object 430 is less distant than being in focus of the imaging system. FIG. 4A shows diagram 400 in perspective view, while FIG. 4B shows diagram 400 in cross-sectional view. FIGS. 4A and 4B are best view together. Object 430 is at a distance 402 from imaging objective 210 (FIGS. 2A and 2B), where distance 402 is greater than distance 202. While FIGS. 4A and 4B illustrate object 430 as being located on optical axis 213, object 430 may be located away from optical axis 213, without departing from the scope hereof. Rays 451 and 452 propagating from object 430 through imaging objective portions 211 and 212 (FIGS. 2A and 2B), respectively, to image sensor 220 intersect at a point 431. According to EQ. 1, since distance 402 ($D_O$) is less than distance 202, distance 403 ($D_I$) is greater than distance 203. Hence, point 431 is located beyond image sensor 220 by a distance 404, denoted $\Delta D$, from the photosensitive surface of image sensor 220. Consequently, as illustrated by rays 451 and 452, imaging objective portions 211 and 212 form respective images 432 and 433 on image sensor 220. Images 432 and 433 are apart from each other by a distance 405, denoted the spatial shift $\Delta S$.

As compared to images 332 and 333 of FIGS. 3A and 3B, images 432 and 433 are reversed such that images 432 and 433 are located on the same side of optical axis 213 as the respective portions 211 and 212 forming images 432 and 433. EQ. 2 still applies. However, the spatial shift $\Delta S$ and the distance $\Delta D$ take on negative values.

Diagram 200 (FIGS. 2A and 2B), diagram 300 (FIGS. 3A and 3B), and diagram 400 (FIGS. 4A and 4B) illustrate that the distance to an object from an imaging system, formed by a single image sensor and a single imaging objective, may be determined from spatial shift between two images formed on the image sensor by two respective portions of the imaging objective. While imaging objective 210 (FIGS. 2A, 2B, 3A, 3B, 4A, and 4B) is assumed to be a thin lens, imaging objective 210 may deviate from the thin lens approximation, without departing from the scope hereof. For example, imaging objective 210 may be a thick lens or a lens system that includes multiple optical components. In the general case, $D_O$ of EQ. 1 is the distance from the object to the front nodal point of imaging objective 210, and $D_I$ of EQ. 1 is the distance from the back nodal point of imaging objective 210 to the focused image of the object.

Figure 5:
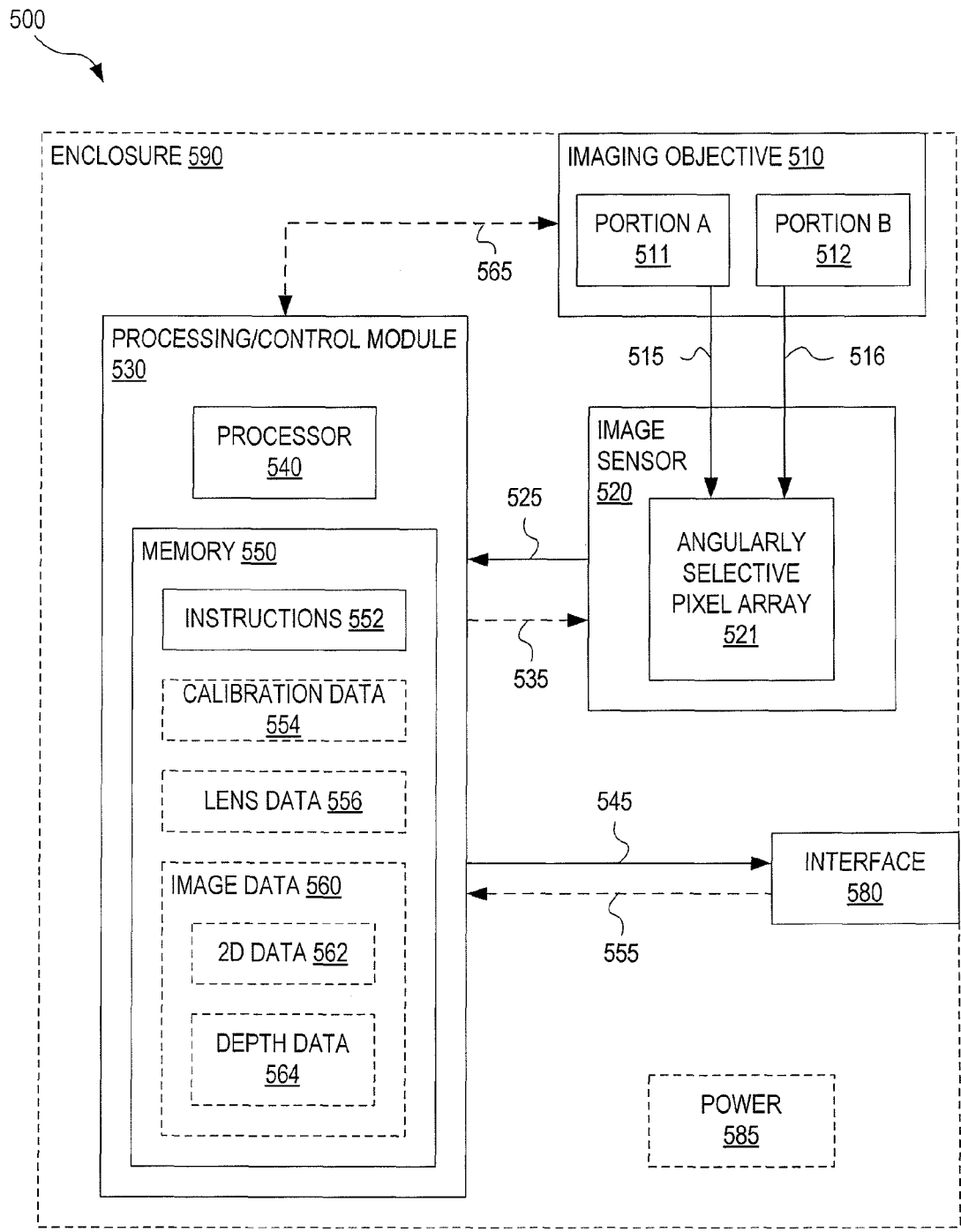
FIG. 5 illustrates an imaging system for obtaining image depth information, according to an embodiment.

FIG. 5 illustrates one exemplary imaging system 500 for obtaining image depth information. Imaging system 500 includes an imaging objective 510, and image sensor 520 having an angularly selective pixel array 521, a processing/control module 530, and an interface 580. Image sensor 520 may be, for example, a charge-coupled device (CCD) image sensor or complementary metal-oxide semiconductor (CMOS) image sensor generating monochrome or color images. Optionally, imaging system 500 includes a power supply 585 for providing power to one or more of imaging objective 510, image sensor 520, processing/control module 530, and interface 580. In an embodiment, imaging system 500 further includes an enclosure 590 for at least partially enclosing imaging objective 510, image sensor 520, processing/control module 530, interface 580, and optional power supply 585. Camera 100 of FIG. 1 is an embodiment of imaging system 500.

Imaging objective 510 has a portion 511 (portion A) and a portion 512 (portion B) for forming respective optical images 515 and 516 of a scene on angularly selective pixel array 521. Angularly selective pixel array 521 is configured to distinguish light propagating at an angle corresponding to coming from portion 511 from light propagating at an angle corresponding to coming from portion 512. Thus, image sensor 520 generates one electronic image 525 from optical image 515 and another electronic image 525 from optical image 516, and communicates electronic images 525 to processing/control module 530. In certain embodiments, the two electronic images corresponding to optical images 515 and 516 are integrated in a single image. Processing/control module 530 includes a processor 540 and memory 550. Memory 550 includes machine-readable instructions 552 stored in a non-volatile portion of memory 550. Processing/control module 530 processes electronic images 525 according to instructions 552 to obtain image depth information 545 and, optionally, other image data. Processing/control module communicates image depth information 545, and optionally other image data, to interface 580. Interface 580 may communicate directly with a user and/or with an external computer through a wired or wireless connection.

In an embodiment, memory 550 includes an image data storage 560 for storing electronic images 525 received by processing/control module 530 from image sensor 520 and/or data derived from electronic images 525. For example, image data storage 560 includes a 2D data storage 562 for storing two-dimensional (2D) images, such as electronic images 525, and/or image depth data storage 564 for storing depth information derived from electronic images 525.

In one embodiment, imaging objective 510 has a fixed focal length and fixed position with respect to image sensor 520. In this embodiment, memory 550 may include lens data 556, such as the focal length of imaging objective 510, the position of portions 511 and 512 with respect to either imaging objective 510 or image sensor 520, and the position of imaging objective 510 with respect to image sensor 520. Processor 540 may utilize lens data 556 to process electronic images 525, as discussed in connection with FIGS. 2A through 4B, to obtain image depth information 545 for the scene imaged by imaging system 500.

In another embodiment, imaging objective 510 has variable focus settings, such as variable focal length and/or variable distance to image sensor 520. For example, imaging objective 510 may be configured to enable autofocus of imaging system 500. Memory 550 includes calibration data 554 that specify a correspondence between observed spatial shifts between optical images 515 and 516, as represented by electronic images 525 and 535, focus setting 565, and image depth. In this embodiment, processing/control module 530 may transmit to imaging objective 510, and/or receive from imaging objective 510, one or more focus parameters 565 defining the focus setting of imaging objective 510. Processor 540 processes electronic images 525, using calibration data 554 and focus setting 565, according to instructions 552 to obtain depth information 545 for the scene imaged by imaging system 500.

Optionally, processing/control module 530 may communicate control settings 535 to image sensor 520 to control at least a portion of the functionality of image sensor 520, such as exposure time, white balance, rate or time of image capture, or gain. Processing/control module 530 may also receive signals 555 from interface 580. For example, a user may communicate a desired focus setting 565 or a control setting 535 to processing/control module 530 through interface 580.

In an alternate embodiment, not illustrated in FIG. 5, at least a portion of the functionality of processing/control module 530 is incorporated into image sensor 520. In another alternate embodiment, at least a portion of the functionality of processing/control module 530 is located externally to optional enclosure 590.

Figure 6:
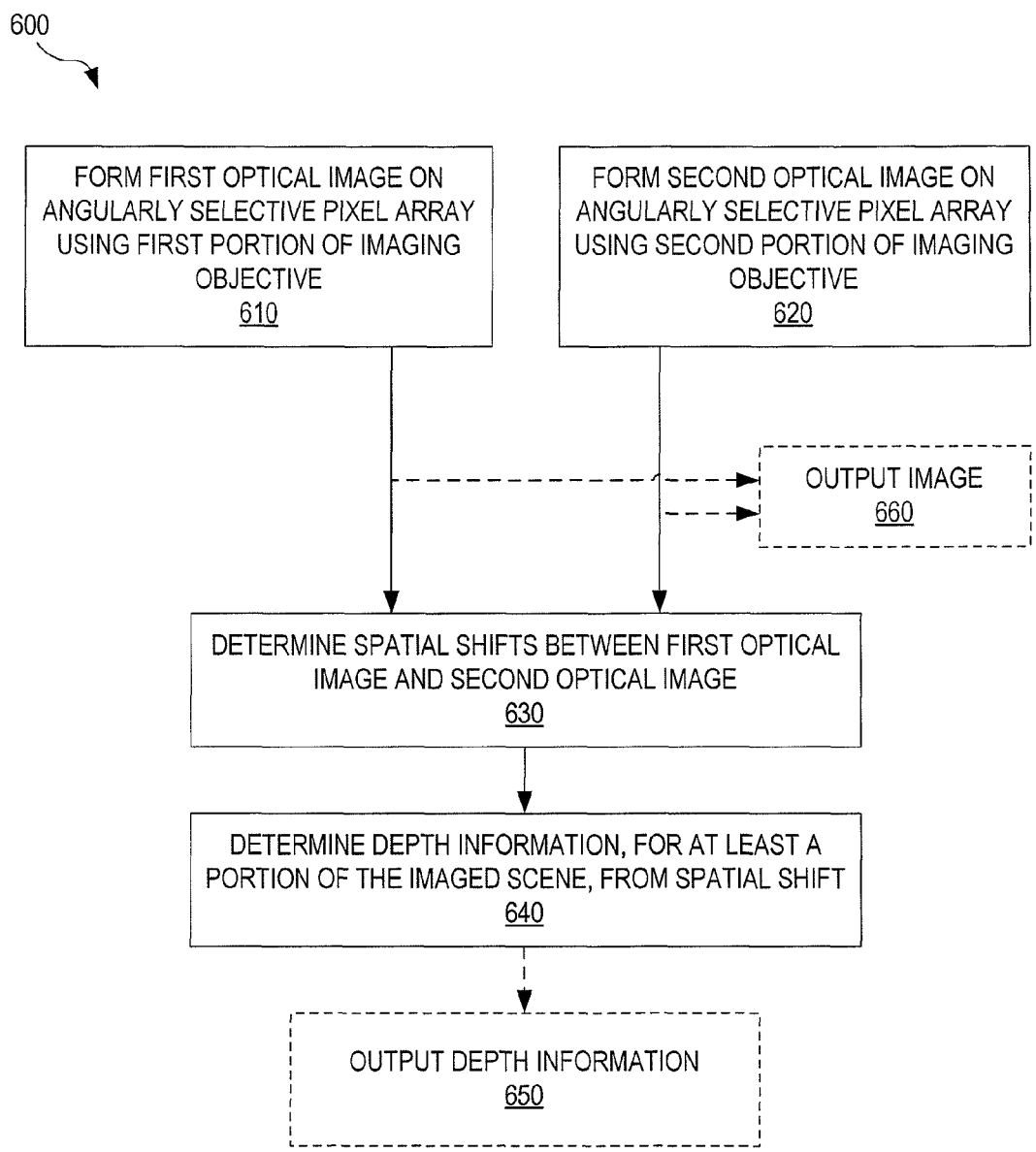
FIG. 6 illustrates a method for obtaining image depth information, according to an embodiment.

FIG. 6 illustrates one exemplary method 600 for obtaining image depth information. Method 600 is performed, for example, by imaging system 500 (FIG. 5). In a step 610, a first optical image of a scene is formed on an angularly selective pixel array of an image sensor, using a first portion of an imaging objective. For example, portion 511 (FIG. 5) of imaging objective 510 (FIG. 5) forms optical image 515 (FIG. 5) on angularly selective pixel array 521 (FIG. 5) of image sensor 520 (FIG. 5). In a step 620, a second optical image of a scene is formed on an angularly selective pixel array of an image sensor, using a second portion of an imaging objective. For example, portion 512 (FIG. 5) of imaging objective 510 (FIG. 5) forms optical image 516 (FIG. 5) on angularly selective pixel array 521 (FIG. 5) of image sensor 520 (FIG. 5). In one embodiment, steps 610 and 620 are performed simultaneously. In another embodiment, steps 610 and 620 are performed in series or offset from each other in time.

In a step 630, spatial shifts between the first optical image and the second optical image are determined. For example, processor 530 (FIG. 5) processes electronic images 525 (FIG. 5) generated from optical images 515 (FIG. 5) and 516 (FIG. 5), according to instructions 552 (FIG. 5) to determine spatial shifts between optical images 515 and 516. Processor 540 may store such spatial shifts to image data storage 560. In a step 640, image depth information, for at least a portion of the imaged scene, from the spatial shifts determined in step 630. For example, processor 540 (FIG. 5) processes spatial shifts determined in step 630, according to instructions 552 (FIG. 5), to determine depth information for at least a portion of the imaged scene.

In an optional step 650, the image depth information is outputted. For example, processing/control module 530 (FIG. 5) communicates image depth information 545 (FIG. 5) to a user or an external computer through interface 580 (FIG. 5). In another optional step 660, one or both of an electronic image representative of the first optical image formed in step 610 and an electronic image representative of the second optical image formed in step 620 is outputted. For example, processing/control module 530 (FIG. 5) outputs electronic images corresponding to optical images 515 (FIG. 5) and 516 (FIG. 5) to a user or an external computer using interface 580 (FIG. 5).

Figure 7:
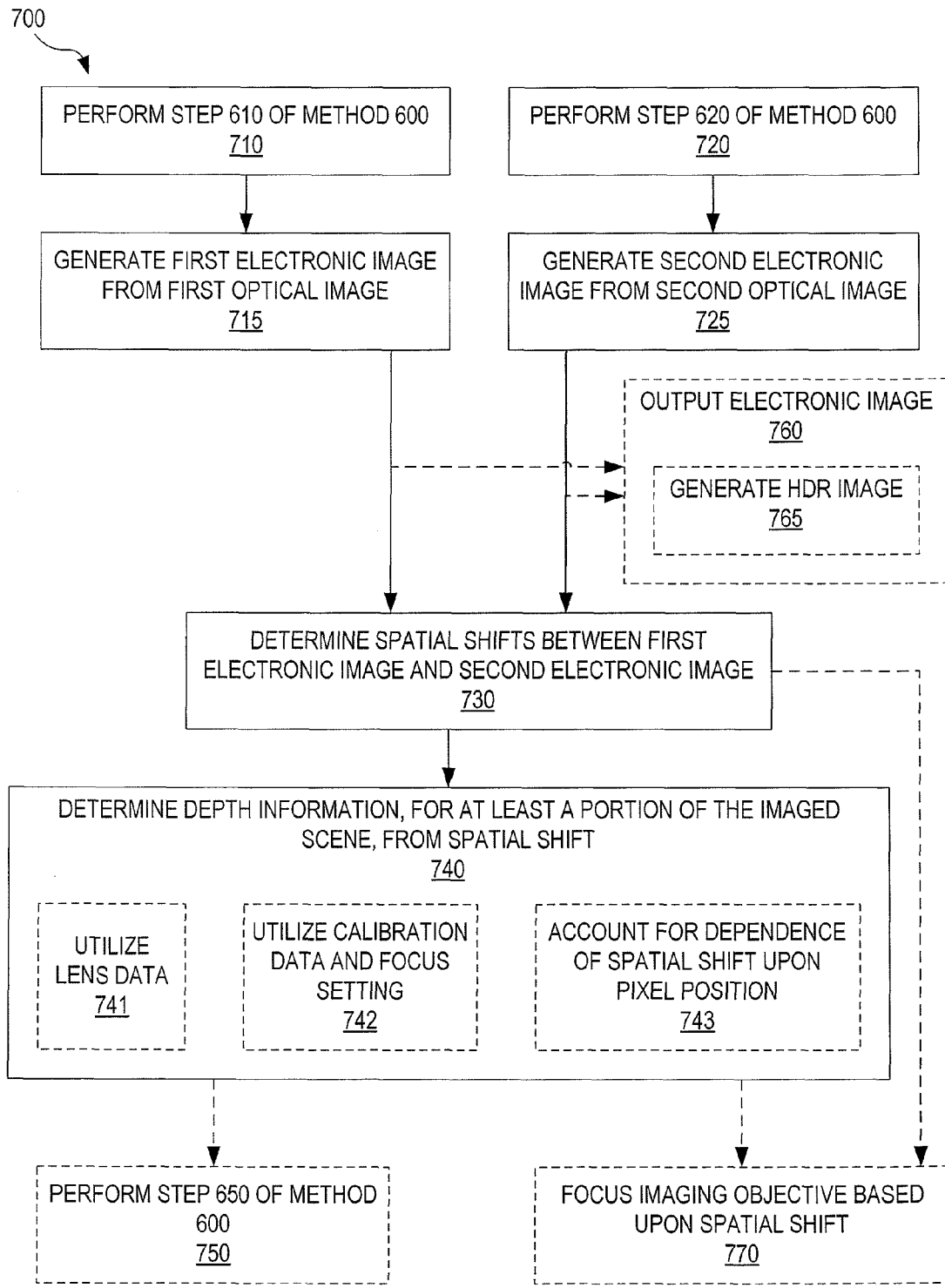
FIG. 7 illustrates a method for obtaining image depth information, which is an embodiment of the method of FIG. 6, according to an embodiment.

FIG. 7 illustrates one exemplary method 700 for obtaining image depth information. Method 700 is an embodiment of method 600 of FIG. 6. Method 700 is, for example, performed by imaging system 500 of FIG. 5. In a step 710, method 700 performs step 610 of method 600 (FIG. 6). In a subsequent step 715, a first electronic image is generated from the first optical image formed in step 710. For example, image sensor 520 (FIG. 5) generates an electronic image 525 (FIG. 5) from optical image 515 (FIG. 5) formed on angularly selective pixel array 521 (FIG. 5) by imaging objective portion 511. In a step 720, method 700 performs step 620 of method 600 (FIG. 6). In a subsequent step 725, a second electronic image is generated from the second optical image formed in step 720. For example, image sensor 520 (FIG. 5) generates an electronic image 525 (FIG. 5) from optical image 516 (FIG. 5) formed on angularly selective pixel array 521 (FIG. 5) by imaging objective portion 512. In an embodiment, steps 710 and 720 are performed simultaneously. In another embodiment, steps 715 and 725 are performed simultaneously. Steps 715 and 725 may be combined in single step, wherein a single electronic image includes electronic images associated with both of the optical images formed in steps 710 and 720.

In a step 730, spatial shifts between the first and second electronic images are determined. For example, processor 540 (FIG. 5) processes a pair of electronic images 525 (FIG. 5) associated with optical images 515 (FIG. 5) and 516 (FIG. 5) to determine spatial shifts. Steps 715, 725, and 730 are an embodiment of step 630 (FIG. 3).

In a step 740, depth information, for at least a portion of the imaged scene, is determined from the spatial shifts determined in step 730. In an embodiment, the distance between the scene and the imaging system, or a component thereof, is determined for each pixel in one of the first and second electronic image. In another embodiment, one or more specific objects in the scene are identified, and the distances from these objects to the imaging system, or a component thereof, are determined. For example, processor 540 (FIG. 5) processes the spatial shifts determined in step 730, according to instructions 552 to determine distances between imaging objective 510 (FIG. 5) and at least a portion of the imaged scene.

In one embodiment, step 740 includes a step 741 that utilizes lens data, such as focal length of the imaging objective, positions of first and second imaging objective portions, and distance between the imaging objective and the image sensor, to obtain depth information from the spatial shifts. For example, in an embodiment of imaging system 500 (FIG. 5) where imaging objective 510 (FIG. 5) has fixed focal length and fixed position relative to image sensor 520 (FIG. 5), processor 540 (FIG. 5) retrieves, from lens data 556 (FIG. 5), the focal length of imaging objective 510 (FIG. 5), the locations of portions 511 (FIG. 5) and 512 (FIG. 5), and the position of imaging objective 510 (FIG. 5) with respect to image sensor 520 (FIG. 5). Processor 540 (FIG. 5) then uses these parameters to process the spatial shifts determined in step 730 according to instructions 552 (FIG. 5), for example as discussed in connection with FIGS. 2A through 4B.

In another embodiment, step 740 includes a step 742 that determines depth information, for at least a portion of the imaged scene, by utilizing a calibrated correspondence between focus settings of the imaging objective, spatial shifts between the first and second electronic images, and image depth. For example, processor 540 (FIG. 5) receives focus setting 565, and retrieves a calibrated correspondence between the spatial shifts determined in step 730, focus setting 565 (FIG. 5), and image depth from calibration data 554 (FIG. 5). Processor 540 (FIG. 5) then uses this information, according to instructions 552 (FIG. 5), to processes the spatial shifts determined in step 730 and determine depth information for at least a portion of the imaged scene.

Step 740 may further include a step 743 that accounts for a dependence of spatial shifts on the pixel position within the angularly selective pixel array. This is relevant, for example, in imaging systems where the portions of the imaging objective selected by angularly selective pixel depends on the position of the angularly selective pixel within the angularly selective pixel array. For example, calibration data 554 (FIG. 5) may include a calibrated correspondence between spatial shift, focus setting 565 (FIG. 5), and image depth from calibration data 554 (FIG. 5), which accounts for portions 511 (FIG. 5) and 512 (FIG. 5) being a function of the position of angularly selective pixels located within angularly selective pixel array 521 (FIG. 5).

In an embodiment, method 700 includes a step 750, performed after step 740, wherein method 700 performs step 650 of method 600 (FIG. 6). Optionally, one or two of the electronic images generated in steps 715 and 725 are outputted. For example, processing/control module 530 (FIG. 5) may output electronic images 525 (FIG. 5) to a user or an external computer via interface 580 (FIG. 5).

In certain embodiments, method 700 includes a step 770 performed subsequently to step 730, wherein the focus setting of the imaging objective is adjusted based upon the spatial shifts determined in step 730. Steps 710, 715, 720, 725, 730, and 770 may be performed several times to minimize the spatial shifts such, which is equivalent to improving the focus. For example, processing/control module 530 (FIG. 5) may communicate a new focus setting 565 (FIG. 5) to imaging objective 510 (FIG. 5). In other embodiments, step 770 is performed subsequently to step 740. In these embodiments, step 770 may utilize a calibrated correspondence focus setting of the imaging objective and an optimally focused image depth to calculate, from a determined image depth, an improved focus setting. For example, processor 540 (FIG. 5) processes an image depth determined in step 740 according to instructions 552 (FIG. 5), and using a calibrated correspondence focus setting of the imaging objective and an optimally focused image depth stored in calibration data 554 (FIG. 5), to determine an improved focus setting 565. Processing/control module 530 (FIG. 5) then transmits the improved focus setting 565 to imaging objective 510.

In an embodiment, method 700 includes a step 760 wherein one or more electronic images, for example the first and/or second electronic image, are outputted. In certain embodiments, step 760 includes a step 765 for generating and outputting a high-dynamic range image, i.e., an image of higher dynamic range than the first electronic image and of higher dynamic range than the second electronic image. In this embodiment of method 700, the first and second electronic images have different brightness. This may be achieved, for example, by using different exposure times and/or gain for capture of the first and second electronic images in steps 715 and 725. Alternatively or in combination therewith, different brightness may be achieved by using larger, and therefore more sensitive, angularly selective pixels for capture of one of the first and second electronic images and smaller, and therefore less sensitive, angularly selective pixels for capture of the other one of the first and second electronic images. In yet another approach, the first and second portions of the imaging objective used in steps 710 and 720, respectively, have different size and/or transmission, such that different amounts of light are detected from each of the first and second portions. This approach may be combined with one or more the other methods mentioned above. Regardless of the specific method chosen for generating first and second electronic images of different brightness, step 765 combines the first and second electronic images to form a single electronic image of higher dynamic range using, for example, methods known in the art. In an example, processor 540 (FIG. 5) combines, according to instructions 552 (FIG. 5), a pair of electronic images 525 (FIG. 5) generated by image sensor 520 (FIG. 5) from optical images 515 (FIG. 5) and 516 (FIG. 5), where the pair of electronic images have different brightness, to form an electronic image of higher dynamic range.

Figure 8A:
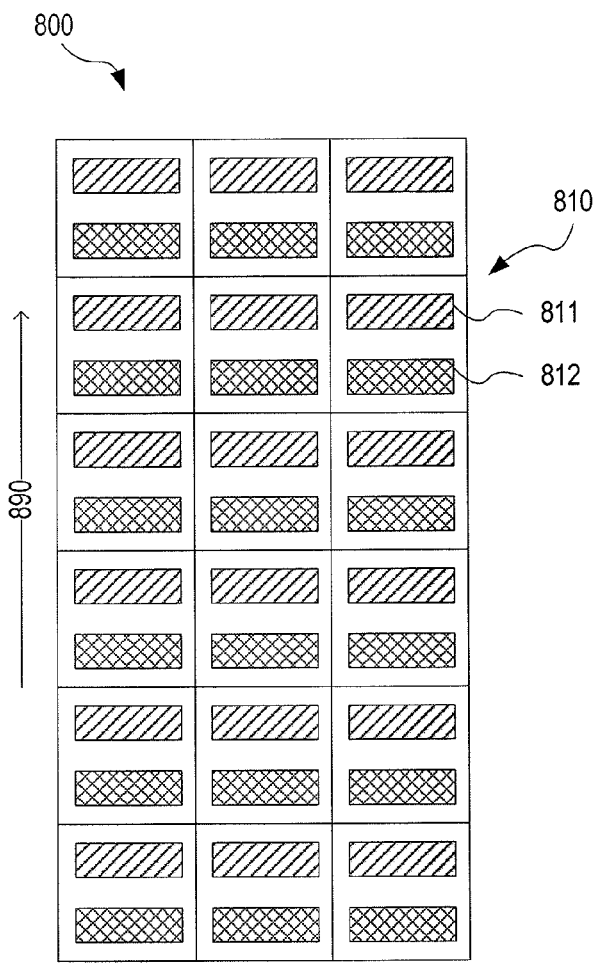
FIGS. 8A and 8B illustrate, in top plan view and cross-sectional side view, respectively, an angularly selective pixel array that may be used to obtain image depth information, according to an embodiment.
Figure 8B:
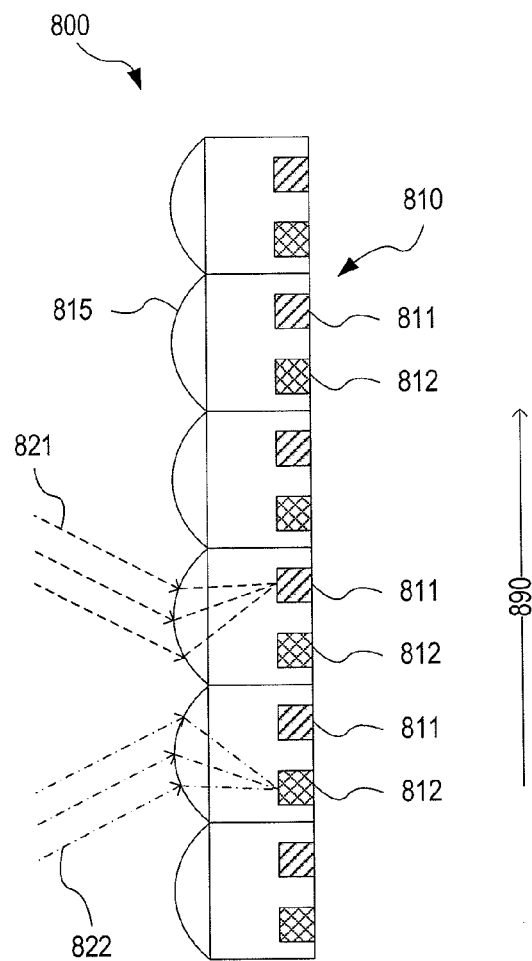

FIGS. 8A and 8B illustrate one exemplary angularly selective pixel array 800 that may be used to obtain image depth information. Angularly selective pixel array 800 is an embodiment of angularly selective pixel array 521 of imaging system 500 (FIG. 5). FIGS. 8A and 8B show angularly selective pixel array 800 in top plan view and cross-sectional side view, respectively. FIGS. 8A and 8B are best viewed together. Angularly selective pixel array 800 includes a plurality of angularly selective pixels 810. Each angularly selective pixel 810 includes a lens 815 and two sub-pixels 811 and 812. In an embodiment, lens 815 is a microlens. In an embodiment, sub-pixels 811 and 812 are photodiodes. Sub-pixels 811 and 812 are located at different positions along a direction 890. For clarity of illustration, not all angularly selective pixels 810, lenses 815, and sub-pixels 811 and 812 are labeled in FIGS. 8A and 8B.

Rays 821 and 822 represent rays incident on angularly selective pixel array 800 at two different angles. Rays 821 represent rays incident on angularly selective pixel array 800 at a downwards angle, i.e., rays 821 have a negative component of travel in direction 890. For clarity of illustration, rays 821 are indicated only for a single angularly selective pixel 810, although rays 821 may be incident on all of angularly selective pixel array 800, or a portion thereof including a plurality of angularly selective pixels 810. Lens 815 directs rays 821 onto sub-pixels 811. Rays 822 represent rays incident on angularly selective pixel array 800 at an upwards angle, i.e., rays 822 have a positive component of travel in direction 890. For clarity of illustration, rays 822 are indicated only for a single angularly selective pixel 810, although rays 822 may be incident on all of angularly selective pixel array 800, or a portion thereof including a plurality of angularly selective pixels 810. Lens 815 directs rays 822 onto sub-pixels 812. Sub-pixels 811 and 812 generate independent electronic signals in response to light incident thereon. Electronic signals generated by sub-pixel 811, in response to incident light, are associated with rays 821. Similarly, electronic signals generated by sub-pixel 812, in response to incident light, are associated with rays 822. Thus, angularly selective pixels 810 output two electronic signals associated with two different propagation directions of incident light. Although, FIG. 8B illustrates each of rays 821 and rays 822 as consisting of parallel rays, each of rays 821 and rays 822 may represent light propagating at a range of angles, without departing from the scope hereof. Likewise, rays 821 and 822 may include other angles of propagation than downwards and upwards, respectively, without departing from the scope hereof.

Angularly selective pixel array 800 may be implemented in imaging system 500 (FIG. 5) as angularly selective pixel array 521, such that rays 821 and 822 represent rays coming from imaging objective portion 511 and 512, respectively. Therefore, each sub-pixel 811 selectively detects light coming from one of portions 511 and 512, i.e., each sub-pixel 811 selectively detects one of optical images 515 and 516. Equivalently, each sub-pixel 812 selectively detects the other one of optical images 515 and 516. Accordingly, angularly selective pixel array 800 is capable of providing electrical signals indicative of spatial shifts in dimension 890. Angularly selective pixel array 800 may be implemented in image sensor 220 of FIGS. 2A through 4B, such that direction 890 is parallel to the direction of spatial shifts ΔS (direction 305 in FIG. 3B and 405 in FIG. 4B).

In an embodiment, sub-pixels 811 and 812 have different sizes. This embodiment is useful for generation of high dynamic range images, as discussed in connection with step 765 (FIG. 7). In certain embodiments, angularly selective pixel array 800 further includes a color filter array for generation of color images, where each angularly selective pixel 810 is configured for detection of light of a certain color. For example, a color pixel may be composed of four angularly selective pixels 810, including an angularly selective pixel 810 for detection of red light, an angularly selective pixel 810 for detection of blue light, and two angularly selective pixels 810 for detection of green light. Angularly selective pixel array 800 may be produced using CCD or CMOS technology.

Figure 9:
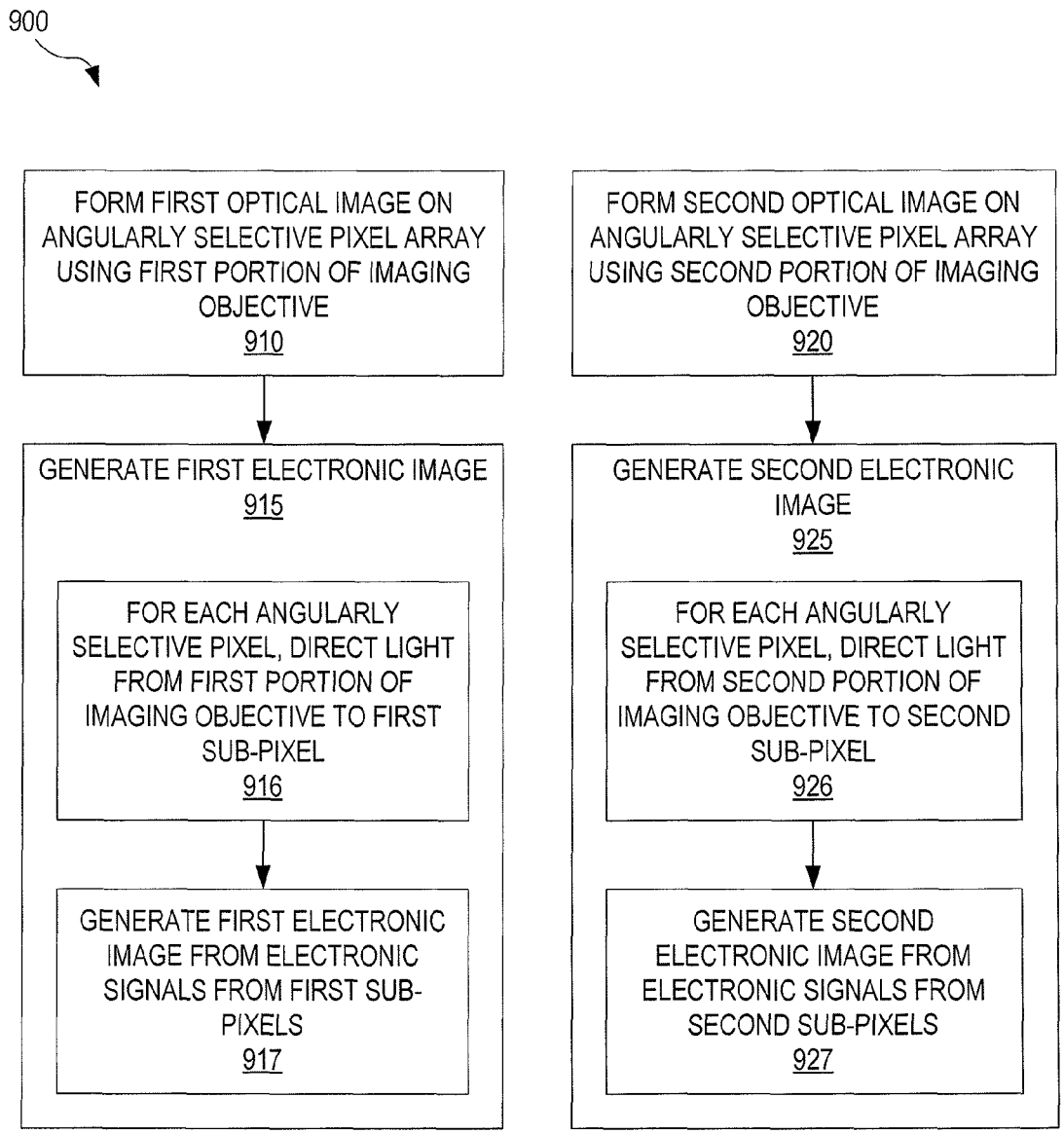
FIG. 9 illustrates a method, using the angularly selective pixel array of FIGS. 8A and 8B, for generating two electronic images associated with optical images, formed by two different portions of an imaging objective, according to an embodiment.

FIG. 9 illustrates one exemplary method 900 for generating two electronic images associated with optical images formed by two different portions of an imaging objective. Method 900 is an embodiment of steps 710, 715, 720, and 725 of method 700 (FIG. 7), and steps 910, 915, 920, and 925 of method 900 are embodiments of respective steps 710, 715, 720, and 725 (FIG. 7). Method 900 is performed, for example, by imaging objective 510 and image sensor 520 of imaging system 500 (FIG. 5), with angularly selective pixel array 800 implemented as angularly selective pixel array 521.

In step 910, a first optical image is formed on an angularly selective pixel array using a first portion of an imaging objective. For example, portion 511 (FIG. 1) forms optical image 515 (FIG. 5) on angularly selective pixel array 800 (FIG. 8), implemented as angularly selective pixel array 521 (FIG. 5). In step 915, a first electronic image is generated from the first optical image formed in step 910. For example, angularly selective pixel array 800 (FIG. 8), implemented as angularly selective pixel array 521 (FIG. 5) generates a first electronic image 525 (FIG. 5) from optical image 515 (FIG. 5). Step 915 includes steps 916 and 917. In step 916, each angularly selective pixel directs light from the first portion of the imaging objective to a first sub-pixel. For example, with angularly selective pixel array 800 (FIG. 8) implemented as angularly selective pixel array 521 (FIG. 5), lens 815 (FIG. 8) of each angularly selective pixel 810 (FIG. 8) directs rays 821 (FIG. 8) from portion 511 (FIG. 5) to sub-pixel 811 (FIG. 8). In step 917, a first electronic image is generated from the first optical image formed in step 910, using the first sub-pixels. For example, image sensor 520

(FIG. 5), with angularly selective pixel array 800 (FIG. 8) implemented as angularly selective pixel array 521 (FIG. 5), processes electronic signals generated by sub-pixels 811 (FIG. 8) in response to rays 821 (FIG. 8) to generate the first electronic image.

Steps 920 and 925 are similar to steps 910 and 915, and are performed in parallel or series therewith. In step 920, a second optical image is formed on an angularly selective pixel array using a second portion of an imaging objective. For example, portion 512 (FIG. 1) forms optical image 516 (FIG. 5) on angularly selective pixel array 800 (FIG. 8), implemented as angularly selective pixel array 521 (FIG. 5). In step 925 a second electronic image is generated from the second optical image formed in step 920. For example, angularly selective pixel array 800 (FIG. 8), implemented as angularly selective pixel array 521 (FIG. 5) generates a second electronic image 525 (FIG. 5) from optical image 516 (FIG. 5). Step 925 includes steps 926 and 927. In step 926, each angularly selective pixel directs light from the second portion of the imaging objective to a second sub-pixel. For example, with angularly selective pixel array 800 (FIG. 8) implemented as angularly selective pixel array 521 (FIG. 5), lens 815 (FIG. 8) of each angularly selective pixel 810 (FIG. 8) directs rays 822 (FIG. 8) from portion 512 (FIG. 5) to sub-pixel 812 (FIG. 8). In step 927, a second electronic image is generated from the second optical image formed in step 910, using the second sub-pixels. For example, image sensor 520 (FIG. 5), with angularly selective pixel array 800 (FIG. 8) implemented as angularly selective pixel array 521 (FIG. 5), processes electronic signals generated by sub-pixels 812 (FIG. 8) in response to rays 822 (FIG. 8) to generate the second electronic image.

Figure 10A:
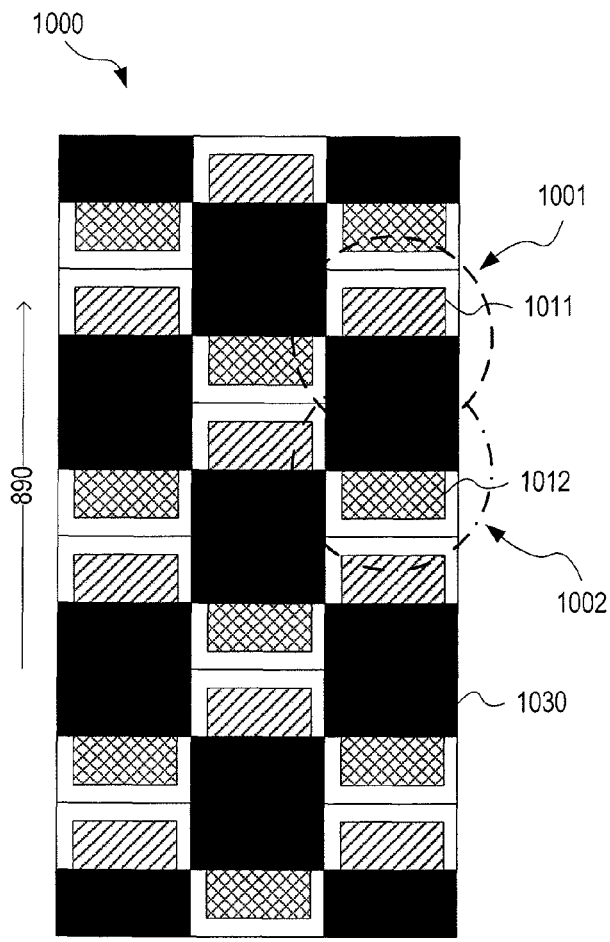
FIGS. 10A and 10B illustrate, in top plan view and cross-sectional side view, respectively, an angularly selective pixel array that may be used to obtain image depth information, according to an embodiment.
Figure 10B:
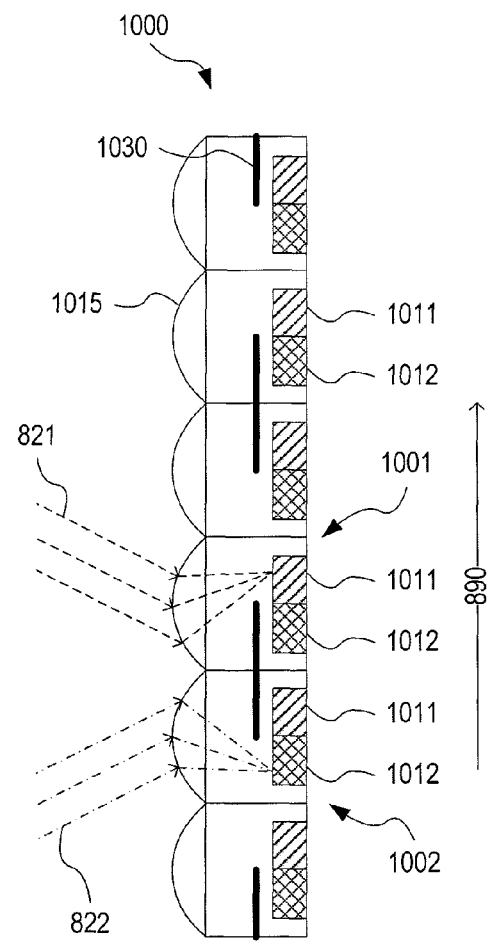

FIGS. 10A and 10B illustrate one exemplary angularly selective pixel array 1000 that may be used to obtain image depth information. Angularly selective pixel array 1000 is an embodiment of angularly selective pixel array 521 of imaging system 500 (FIG. 5). FIGS. 10A and 10B show angularly selective pixel array 1000 in top plan view and cross-sectional side view, respectively. FIGS. 10A and 10B are best viewed together. Angularly selective pixel array 1000 includes a plurality of angularly selective pixels 1001 and a plurality of angularly selective pixels 1002. Each angularly selective pixel 1001 and 1002 includes a lens 1015, two pixel portions 1011 and 1012, and a portion of a mask 1030. In an embodiment, lens 1015 is a microlens. Pixel portions 1011 and 1012 represent two portions of a single photosensitive element, such as a photodiode. Pixel portions 1011 and 1012 are located at different positions along direction 890 (FIG. 8). For clarity of illustration, not all angularly selective pixels 1001 and 1002, lenses 1015, pixel portions 1011 and 1012, and portions of mask 1030 are labeled in FIGS. 10A and 10B.

Rays 821 and 822 of FIG. 8 are incident on angularly selective pixel array 1000. For clarity of illustration, rays 821 are indicated only for a single angularly selective pixel 1011, although rays 821 may be incident on all of angularly selective pixel array 1000, or a portion thereof including a plurality of angularly selective pixels 1011. Also for clarity of illustration, rays 822 are indicated only for a single angularly selective pixel 1012, although rays 822 may be incident on all of angularly selective pixel array 1000, or a portion thereof including a plurality of angularly selective pixels 1012. Lens 1015 directs rays 821 towards pixel portion 1011. Lens 815 directs rays 822 towards pixel portion 1012. Each angularly selective pixel 1001 and 1002 generates a single electronic signal in response to light incident on pixel portions 1011 and 1012. This is in contrast to the functionality of sub-pixels 811 and 812 of FIG. 8.

In each angularly selective pixel 1001, the portion of mask 1030 is positioned to transmit at least a portion of rays 821 propagating towards pixel portion 1011, and block rays 822 propagating towards pixel portion 1012. Thus an electronic signal generated by angularly selective pixel 1001 in response to incident light, is associated with rays 821. Similarly, in each angularly selective pixel 1002, the portion of mask 1030 is positioned to block rays 821 propagating towards pixel portion 1011, and transmit at least a portion of rays 822 propagating towards pixel portion 1012. Thus an electronic signal generated by angularly selective pixel 1002 in response to incident light, is associated with rays 822.

Angularly selective pixel array 1000 may be implemented in imaging system 500 (FIG. 5) as angularly selective pixel array 521, such that rays 821 and 822 represent rays coming from imaging objective portion 511 and 512, respectively. Therefore, each angularly selective pixel 1001 selectively detects light coming from one of portions 511 and 512, i.e., each angularly selective pixel 1001 selectively detects one of optical images 515 and 516. Equivalently, angularly selective pixel 1002 selectively detects the other one of optical images 515 and 516. Accordingly, angularly selective pixel array 1000 is capable of providing electrical signals indicative of spatial shifts in dimension 890. Angularly selective pixel array 1000 may be implemented in image sensor 220 of FIGS. 2A through 4B, such that direction 890 is parallel to the direction of spatial shifts ΔS (direction 305 in FIG. 3B and 405 in FIG. 4B).

Although FIG. 10 illustrates mask 1030 as having a checkerboard pattern, such that angularly selective pixels 1001 and 1002 alternate in both dimension, mask 1030 may be configured differently, without departing from the scope hereof. For example, mask 1030 may be configured to produce an angularly selective pixel array, wherein columns of angularly selective pixels 1001 alternate with columns of angularly selective pixels 1002. Further, mask 1030 may be configured such that the number of angularly selective pixels 1001 is different from the number of angularly selective pixels 1002.

In an embodiment, pixel portions 1011 and 1012 have different sizes, and mask 1030 is modified accordingly to transmit and block light as discussed above. This embodiment is useful for generation of high dynamic range images, as discussed in connection with step 765 (FIG. 7).

In certain embodiments, angularly selective pixel array 1000 further includes a color filter array for generation of color images, where each angularly selective pixel 1001 and 1002 is configured for detection of light of a certain color. For example, a color pixel may be composed of four angularly selective pixels 1001 (or 1002), including an angularly selective pixel 1001 (or 1002) for detection of red light, an angularly selective pixel 1001 (or 1002) for detection of blue light, and two angularly selective pixels 1001 (or 1002) for detection of green light. Angularly selective pixel array 1000 may be produced using CCD or CMOS technology.

Figure 11:
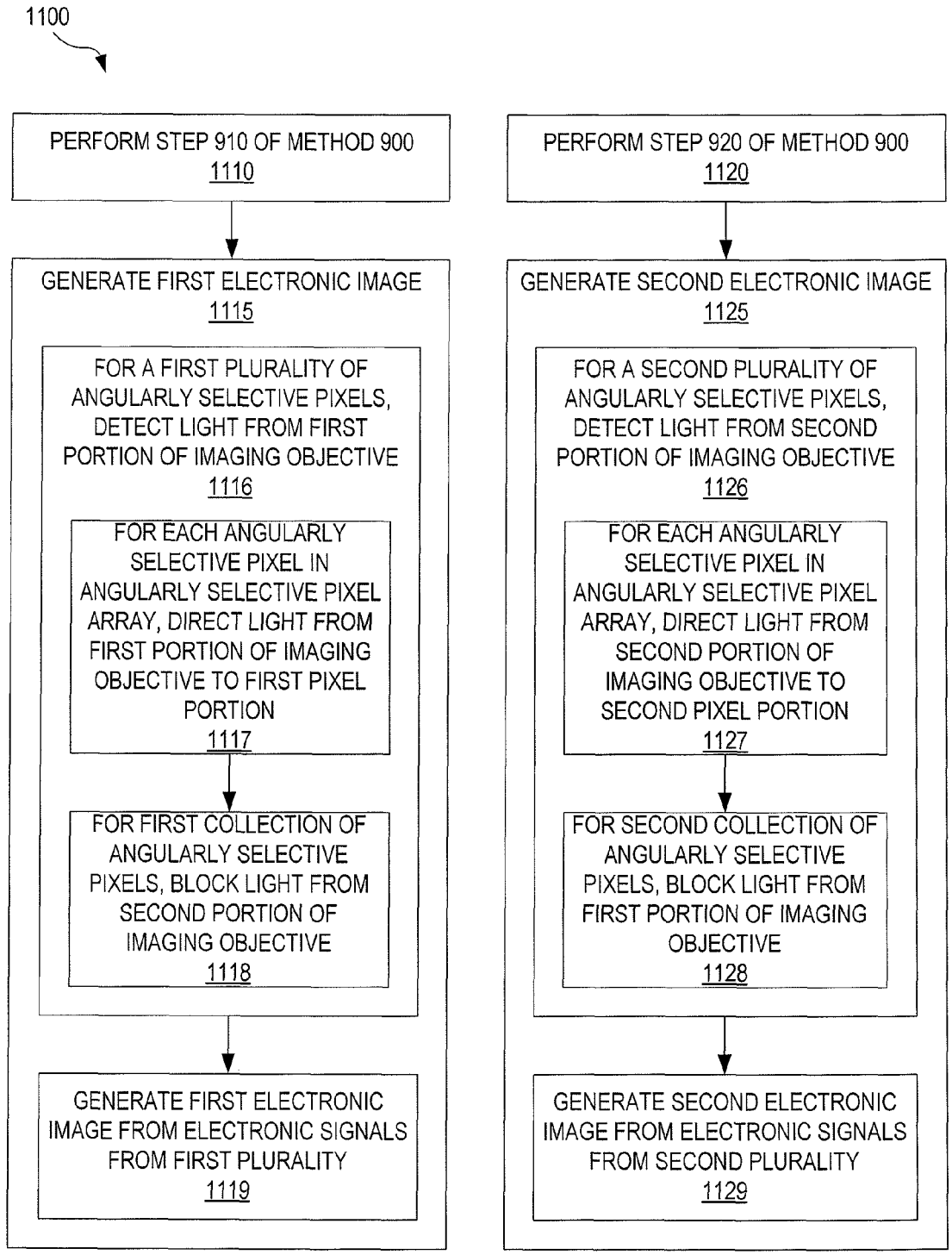
FIG. 11 illustrates a method, using the angularly selective pixel array of FIGS. 10A and 10B, for generating two electronic images associated with optical images, formed by two different portions of an imaging objective, according to an embodiment.

FIG. 11 illustrates one exemplary method 1100 for generating two electronic images associated with optical images formed by two different portions of an imaging objective. Method 1100 is an embodiment of steps 710, 715, 720, and 725 of method 700 (FIG. 7), and steps 1110, 1115, 1120, and 1125 of method 1100 are embodiments of respective steps 710, 715, 720, and 725 (FIG. 7). Method 1100 is performed, for example, by imaging objective 510 and image sensor 520 of imaging system 500 (FIG. 5), with angularly selective pixel array 1000 implemented as angularly selective pixel array 521.

In a step 1110, method 1100 performs step 910 of method 900 (FIG. 9). For example, portion 511 (FIG. 1) forms optical image 515 (FIG. 5) on angularly selective pixel array 1000 (FIG. 10), implemented as angularly selective pixel array 521 (FIG. 5). In step 1115, a first electronic image is generated from the first optical image formed in step 1110. For example, angularly selective pixel array 1000 (FIG. 10), implemented as angularly selective pixel array 521 (FIG. 5) generates a first electronic image 525 (FIG. 5) from optical image 515 (FIG. 5). Step 1115 includes steps 1116 and 1119. In step 1116, light from the first portion of the imaging objective is detected by a first plurality of angularly selective pixels. Step 1116 includes steps 1117 and 1118. In step 1117, each angularly selective pixel of the angularly selective pixel array, directs light from the first portion of the imaging objective to a first pixel portion, i.e., a portion of a photosensitive element. For example, with angularly selective pixel array 1000 (FIG. 10) implemented as angularly selective pixel array 521 (FIG. 5), lens 1015 (FIG. 10) of each angularly selective pixel 1001 and 1002 (FIG. 10) directs rays 821 (FIGS. 8 and 10) from portion 511 (FIG. 5) towards pixel portion 1011 (FIG. 10). In step 1118, light from a second portion of the imaging objective, different from the first portion, is blocked for each angularly selective pixel in the first plurality of angularly selective pixels. For example, with angularly selective pixel array 1000 (FIG. 10) implemented as angularly selective pixel array 521 (FIG. 5), a portion of mask 1030 (FIG. 10) blocks rays 822 (FIGS. 8 and 10) coming from portion 512 (FIG. 5) for all angularly selective pixels 1001 (FIG. 10). Mask 1030 (FIG. 10) transmits at least a portion of rays 821 (FIGS. 8 and 10) coming from portion 511 (FIG. 5), for all angularly selective pixels 1001 (FIG. 10). In step 1119, a first electronic image is generated from the first optical image formed in step 1110, using the first plurality of angularly selective pixels. For example, image sensor 520 (FIG. 5), with angularly selective pixel array 1000 (FIG. 10) implemented as angularly selective pixel array 521 (FIG. 5), processes electronic signals generated by angularly selective pixels 1001 (FIG. 10) in response to rays 821 (FIGS. 8 and 10) to generate the first electronic image.

Steps 1120 and 1125 are similar to steps 1110 and 1115, and are performed in parallel or series therewith. In a step 1120, method 1100 performs step 920 of method 900 (FIG. 9). For example, portion 511 (FIG. 1) forms optical image 516 (FIG. 5) on angularly selective pixel array 1000 (FIG. 10), implemented as angularly selective pixel array 521 (FIG. 5). In step 1125, a second electronic image is generated from the second optical image formed in step 1120. For example, angularly selective pixel array 1000 (FIG. 10), implemented as angularly selective pixel array 521 (FIG. 5) generates a second electronic image 525 (FIG. 5) from optical image 515 (FIG. 5). Step 1125 includes steps 1126 and 1129. In step 1126, light from the second portion of the imaging objective is detected by a second plurality of angularly selective pixels. Step 1126 includes steps 1127 and 1128. In step 1127, each angularly selective pixel of the angularly selective pixel array, directs light from the second portion of the imaging objective to a second pixel portion, i.e., a portion of a photosensitive element. For example, with angularly selective pixel array 1000 (FIG. 10) implemented as angularly selective pixel array 521 (FIG. 5), lens 1015 (FIG. 10) of each angularly selective pixel 1001 and 1002 (FIG. 10) directs rays 821 (FIGS. 8 and 10) from portion 511 (FIG. 5) towards pixel portion 1011 (FIG. 10). In step 1128, light from the first portion of the imaging objective is blocked for each angularly selective pixel in the second plurality of angularly selective pixels. For example, with angularly selective pixel array 1000 (FIG. 10) implemented as angularly selective pixel array 521 (FIG. 5), a portion of mask 1030 (FIG. 10) blocks rays 821 (FIGS. 8 and 10) coming from portion 511 (FIG. 5) for all angularly selective pixels 1002 (FIG. 10). Mask 1030 (FIG. 10) transmits at least a portion of rays 822 (FIGS. 8 and 10) coming from portion 512 (FIG. 5), for all angularly selective pixels 1002 (FIG. 10). In step 1129, a second electronic image is generated from the second optical image formed in step 1120, using the second plurality of angularly selective pixels. For example, image sensor 520 (FIG. 5), with angularly selective pixel array 1000 (FIG. 10) implemented as angularly selective pixel array 521 (FIG. 5), processes electronic signals generated by angularly selective pixels 1002 (FIG. 10) in response to rays 822 (FIGS. 8 and 10) to generate the second electronic image.

Figure 12:
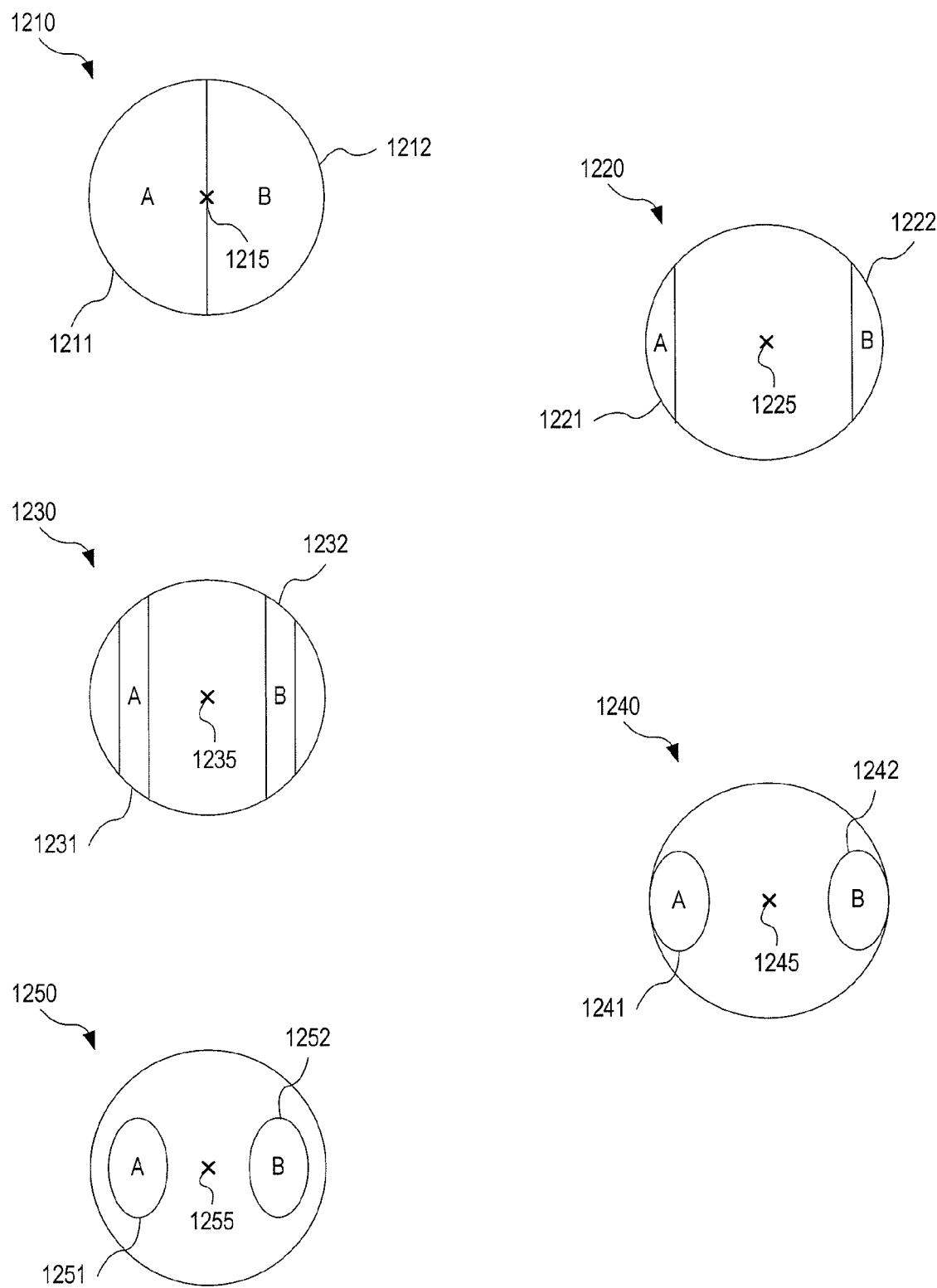
FIG. 12 illustrates exemplary imaging objectives, each having two different portions for forming two respective optical images that may be used to obtain image depth information, according to an embodiment.

FIG. 12 illustrates exemplary imaging objectives 1210, 1220, 1230, 1240, and 1250, each having two different portions for forming two respective optical images that may be used to obtain image depth information. FIG. 12 illustrates imaging objectives 1210, 1220, 1230, 1240, and 1250 in cross-sectional view, where the cross section is perpendicular to the optical axis of the imaging objective.

Imaging objective 1210 includes two portions 1211 and 1212 coinciding with a first and a second half of imaging objective 1210. Portions 1211 and 1212 are located on opposite sides of the optical axis 1215 of imaging objective 1210. Imaging objective 1220 includes two portions 1221 and 1222 that are extreme portions of the imaging objective. Portions 1221 and 1222 are located on opposite sides of the optical axis 1225 of imaging objective 1220. Imaging objective 1230 includes two strip-shaped portions 1231 and 1232 located on opposite sides of the optical axis 1235 of imaging objective 1230. Imaging objective 1240 includes two portions 1241 and 1242 that are elliptical areas located at opposite extremes of imaging objective 1240. Portions 1241 and 1242 are located on opposite sides of the optical axis 1245 of imaging objective 1240. Imaging objective 1250 includes two portions 1251 and 1252 that are elliptical areas located on opposite sides of the optical axis 1255 of imaging objective 1250.

The two portions of the imaging objective may be configured differently from what is illustrated in FIG. 12, without departing from the scope hereof. For example, the two portions may have shapes and sizes different from those illustrated in FIG. 12. Likewise, the two portions may be shaped and/or sized differently from each other. Additionally, the two portions may not be on opposite sides of the optical axis. Further, the two portions may have some degree of overlap. Such an overlap may induce crosstalk between the two optical images. However, the crosstalk may be sufficiently small that image depth information may be obtained. The two portions of the imaging objective may be formed in part by masking other portions of the imaging objective. A mask for performing such masking may be integrated in the imaging objective or separate therefrom.

Figure 13:
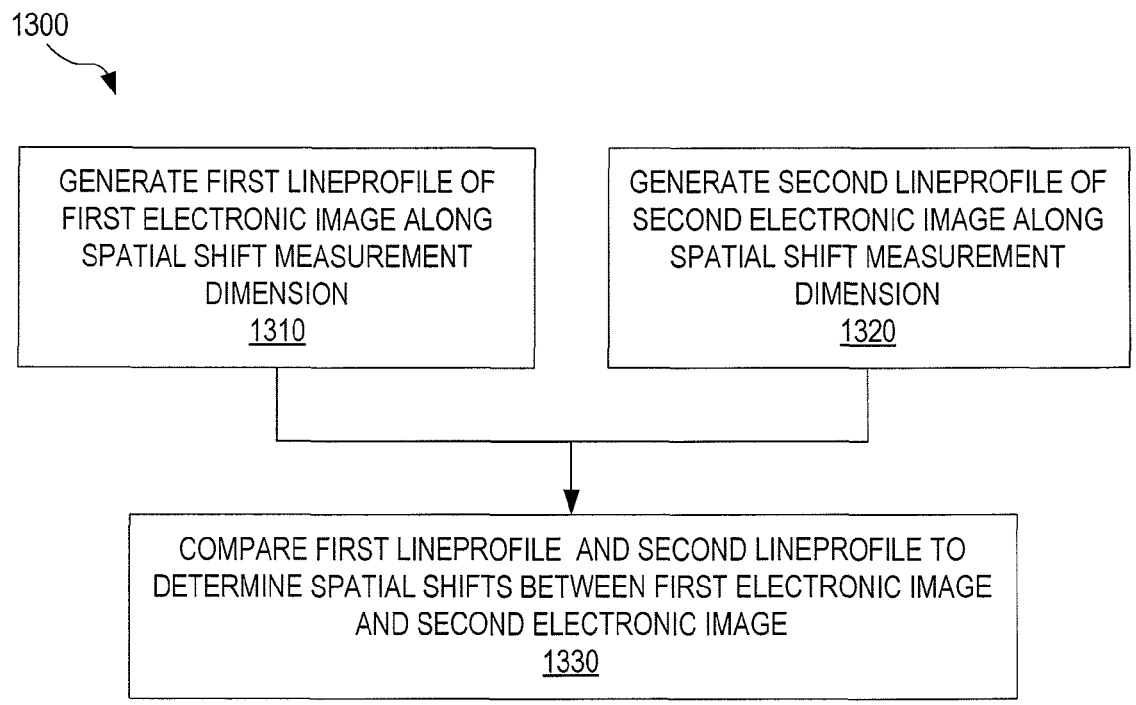
FIG. 13 illustrates a method for determining spatial shifts between two electronic images of a scene, where the two electronic images are generated using two different portions of an imaging objective, according to an embodiment.

FIG. 13 illustrates one exemplary method 1300 for determining spatial shifts between two electronic images of a scene, where the two electronic images are generated using two different portions of an imaging objective. Method 1300 is an embodiment of step 730 of FIG. 7 and may be performed by processing/control module 530 of imaging system 500 (FIG. 5).

In a step 1310, a first lineprofile of a first electronic image is generated. The first lineprofile is taken along a dimension, in which spatial shifts are to be determined. For example, the lineprofile is taken along a dimension that corresponds to directions 305 (FIG. 3), 405 (FIG. 4), or 890 (FIGS. 8 and 10). Step 1310 is performed, for example, by processor 540 (FIG. 5) according to instructions 554 (FIG. 5). Processor 540 (FIG. 5) generates a lineprofile of an optical image 525 (FIG. 5), generated from optical image 515 (FIG. 5), along the dimension in which spatial shifts are to be determined. Similarly, in a step 1320 a second lineprofile of a second electronic image is generated. The second lineprofile is taken along a dimension, in which spatial shifts are to be determined. For example, the lineprofile is taken along a dimension that corresponds to directions 305 (FIG. 3), 405 (FIG. 4), or 890 (FIGS. 8 and 10). Step 1310 is performed, for example, by processor 540 (FIG. 5) according to instructions 554 (FIG. 5). Processor 540 (FIG. 5) generates a lineprofile of an optical image 525 (FIG. 5), generated from optical image 516 (FIG. 5), along the dimension in which spatial shifts are to be determined. For both step 1310 and 1320, the lineprofile may represent an average of a finite image extent in a dimension orthogonal to the dimension in which spatial shifts are to be determined. For example, a rectangular portion of the electronic image may be projected onto the dimension, in which spatial shifts are to be determined, and a lineprofile created from the projection.

In a step 1330, the first and second lineprofiles generated in steps 1310 and 1320, respectively, are compared to determine spatial shifts between the first and second electronic image. In one embodiment, spatial shifts are determined for each pixel position along the lineprofiles. Optionally, this includes interpolating between positions with observable spatial shifts. For example, the spatial shift associated with an interior location of a uniformly bright object or uniformly colored object may be determined by interpolation between boundaries of the object. In another embodiment, spatial shifts are determined only for objects, or image portions, that produce observable spatial shifts. Step 1330 is performed, for example, by processor 540 (FIG. 5) according to instructions 552 (FIG. 5).

Method 1300 may be repeated for multiple portions of the first and second electronic images to determine spatial shifts for image portions at different position in the dimension orthogonal to the dimension for determining spatial shifts.

Figure 14:
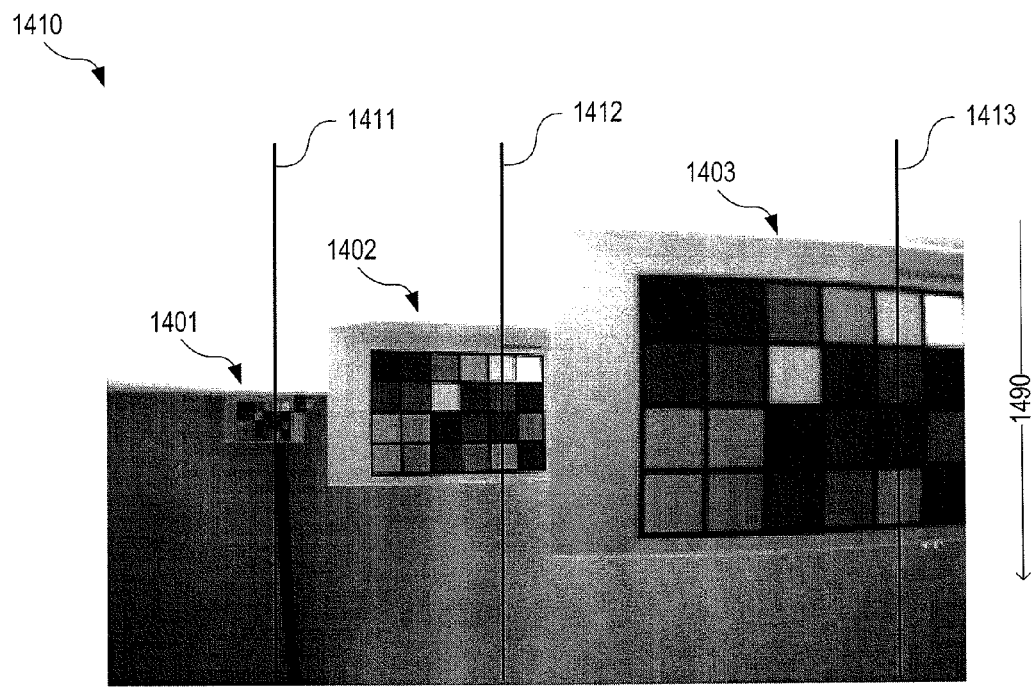
FIG. 14 shows an electronic image and associated spatial shift data generated using an embodiment of the imaging system of FIG. 5 including an embodiment of the angularly selective pixel array of FIG. 8.
Figure 14:
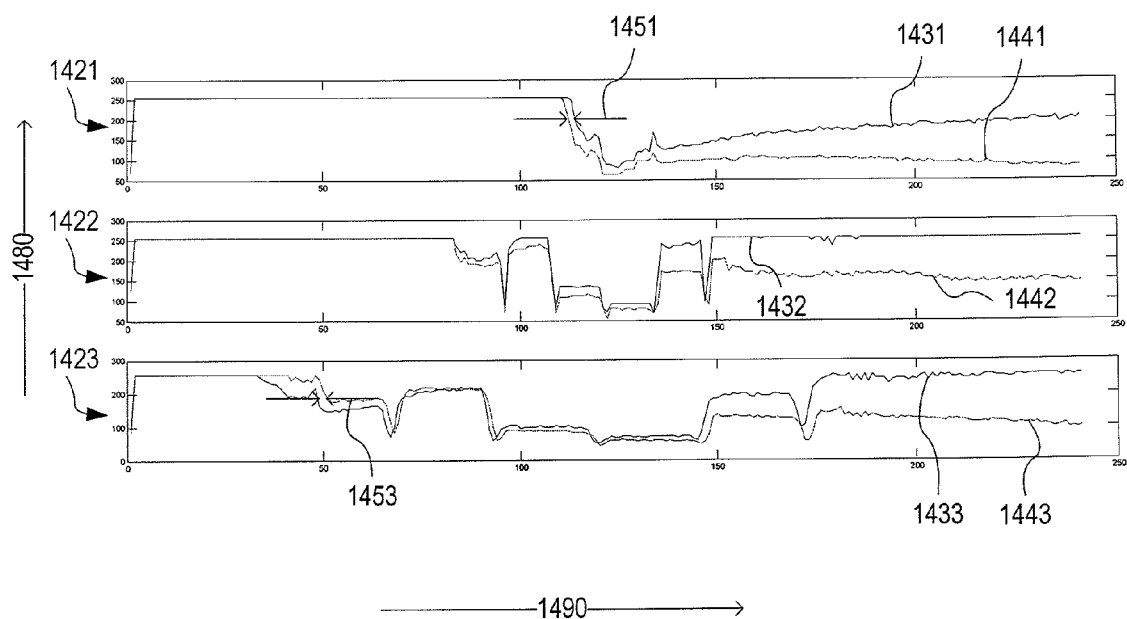

FIG. 14 shows an electronic image and associated spatial shift data generated using an embodiment of imaging system 500 FIG. 5, with angularly selective pixel array 800 (FIG. 8) implemented as angularly selective pixel array 521 (FIG. 5). Image 1410 is one of a first and second electronic image of a scene generated according to method 900 (FIG. 9) by imaging system 500 of FIG. 5 using a first portion, portion 511, and a second portion, portion 512, of imaging objective 510. The scene includes three identical objects 1401, 1402, and 1403 located at three different distances from imaging system 500. Direction 1490 is the direction along which spatial shifts are determined. Direction 1490 is equivalent to direction 890 of FIG. 8. Spatial shifts are determined from the two electronic images using method 1300 of FIG. 13. Resulting spatial shift data are shown in graphs 1421, 1422, and 1423. Lineprofiles are plotted as brightness 1480 as a function of position along direction 1490.

Graph 1421 shows lineprofiles 1431 and 1441 taken along line 1411, as illustrated in image 1410, for each of the first and second electronic images. Line 1411 passes through object 1401, which is the most distant of the three identical objects. Object 1401 is located further away from imaging system 500 (FIG. 5) than an object in focus. This is equivalent to the situation illustrated by diagram 300 of FIG. 3. A spatial shift 1451 between lineprofiles 1431 and 1441 indicates a spatial shift of the upper boundary of object 1401. The distance to object 1401 may be determined from phase shift 1451, for example as discussed in connection with FIGS. 2A through 4B.

Graph 1422 shows lineprofiles 1432 and 1442 taken along line 1412, as illustrated in image 1410, for each of the first and second electronic images. Line 1412 passes through object 1402, which is in focus of imaging system 500 (FIG. 5). This is equivalent to the situation illustrated by diagram 200 of FIG. 2. There are no observable spatial shifts associated with object 1402, and it may be deduced therefrom that object 1402 is located at the focus distance of imaging system 500 (FIG. 5).

Graph 1423 shows lineprofiles 1433 and 1443 taken along line 1413, as illustrated in image 1410, for each of the first and second electronic images. Line 1413 passes through object 1403, which is the least distant of the three identical objects. Object 1403 is located closer to imaging system 500 (FIG. 5) than an object in focus. This is equivalent to the situation illustrated by diagram 400 of FIG. 4. A spatial shift 1453 between lineprofiles 1433 and 1443 indicates a spatial shift of the upper boundary of object 1403. The distance to object 1403 may be determined from phase shift 1453, for example as discussed in connection with FIGS. 2A through 4B.

The data presented in FIG. 14 illustrate that spatial shifts may be determined even when the object associated with the spatial shifts is not in focus. In certain embodiments, imaging system 500 is used to determine the image depth for objects outside the depth of field of the imaging system.

Combinations of Features

Features described above as well as those claimed below may be combined in various ways without departing from the scope hereof. For example, it will be appreciated that aspects of one system or method for obtaining image depth information described herein may incorporate or swap features of another system or method for obtaining image depth information described herein. The following examples illustrate possible, non-limiting combinations of embodiments described above. It should be clear that many other changes and modifications may be made to the methods and device herein without departing from the spirit and scope of this invention:

(A) A system for obtaining image depth information for at least one object in a scene may include (i) an imaging objective, including a first portion for forming a first optical image of the scene and a second portion for forming a second optical image of the scene, the first portion being different from the second portion, and (ii) an image sensor for capturing the first and second optical images and generating respective first and second electronic images therefrom.

(B) The system denoted as (A) may further include a processing module for processing the first and second electronic images to determine the depth information.

(C) In the system denoted as (B), the processing module may include instructions for determining the depth information from spatial shift between the first and second electronic images.

(D) In the system denoted as (C), the processing module may further include calibration data, including correspondence between the spatial shift, a focus setting of the imaging objective, and the depth information.

(E) In the system denoted as (D), the instructions may further include instructions for utilizing the calibration data to determine the depth information from the spatial shift between the first and second electronic images.

(F) In the systems denoted as (A) through (E), the imaging objective may have an optical axis, and the first and second portions of the imaging objective may be located on opposing sides of the optical axis.

(G) In the systems denoted as (A) through (F), the image sensor may include a plurality of pixels having angular selectivity such that light detected by the image sensor is associated with a known one of the first and second portions of the imaging objective.

(H) In the system denoted as (G), each pixel may include a first sub-pixel for generating a portion of the first electronic image, a second sub-pixel for generating a portion of the second electronic image, and a lens for directing light, propagating towards the pixel, from the first and second portions of the imaging objective onto the first and second sub-pixels, respectively.

(I) In the system denoted as (H), the first and second sub-pixels may have different sensitivity.

(J) In the systems denoted as (G) through (I), each pixel may detect light from a selected one of the first and second portions of the imaging objective.

(K) In the systems denoted as (A) through (F), each pixel may include (i) a lens for directing light, propagating towards the pixel, from the first and second portions of the imaging objective onto respective first and second portions of the pixel, and (ii) a mask for blocking light from a non-selected one of the first and second portions of the imaging objective.

(L) In the systems denoted as (A) through (K), the imaging objective may have adjustable focal length.

(M) In the systems denoted as (A) through (K), the imaging objective may have fixed focal length.

(N) In the systems denoted as (A) through (M), the imaging objective may have fixed position relative to the image sensor.

(O) In the systems denoted as (A) through (N), the depth information may include distance from the system to the at least one object.

(P) A method for obtaining image depth information for at least one object in a scene may include forming first and second images of the scene, using respective first and second portions of an imaging objective, on a single image sensor.

(Q) The method denoted as (P) may further include determining the depth information from a spatial shift between the first and second images.

(R) In the methods denoted as (P) and (Q) of claim 14, the step of forming may include simultaneously forming first and second images of the scene, using respective first and second portions of an imaging objective, on a single image sensor.

(S) The methods denoted as (P) through (R) may further include generating respective first and second electronic images from the first and second images.

(T) The method denoted as (S), may further include determining depth information from the spatial shift between the first and second electronic images.

(U) In the methods denoted as (P) through (T), the single image sensor may include a plurality of pixels having a respective plurality of first sub-pixels and a respective plurality of second sub-pixels.

(V) In the methods denoted as (S) and (T), the single image sensor may include a plurality of pixels having a respective plurality of first sub-pixels and a respective plurality of second sub-pixels, and the step of generating may further include (a) directing light from the first portion to the first sub-pixels and directing light from the second portion to the second sub-pixels and (b) generating the first and second electronic images using electronic signals from the first and second sub-pixels, respectively.

(W) In the methods denoted as (S) and (T), the single image sensor may include a plurality of pixels, and the step of generating may further include (a) for each pixel, directing light from the first and second portions of the imaging objective to a first and second portion, respectively, of the pixel, (b) for a first subset of the plurality of pixels, blocking light from the second portion of the imaging objective, (c) for a second subset of the plurality of pixels, blocking light from the first portion of the imaging objective, and (d) generating the first and second electronic images from electronic signals from pixels in the first and second subsets, respectively.

(X) The methods denoted as (P) through (W) may include determining the depth information by utilizing calibrated correspondence between the spatial shift, a focus setting of the imaging objective, and the depth information.

(Y) In the method denoted as (X), the focus setting may include a value of a parameter that controls an adjustable focusing property of the imaging objective.

(Z) The methods denoted as (P) through (Y) may further include adjusting a focusing property of the imaging objective to bring at least a portion of the scene inside depth of field.

(AA) In the methods denoted as (P) through (ZZ), the step of forming may include forming first and second images of the scene, using respective first and second portions of the imaging objective located on opposing sides of optical axis of the imaging objective, on a single image sensor.

(AB) In the methods denoted as (P) through (AA) first and second electronic images, generated from the first and second images, may have different sensitivities.

(AC) The method denoted as (AB) may further include combining the first and second electronic images to generate a third electronic image of higher dynamic range than each of the first and second electronic images.

(AD) The methods denoted as (P) through (AC) may further include further comprising adjusting, based upon a spatial shift between the first and second images, a lens parameter to improve image focus.

(AE) In the methods denoted as (P) through (AD), the depth information may include distance from the system to the at least one object.

Changes may be made in the above systems and methods without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present system and method, which, as a matter of language, might be said to fall therebetween.

What is claimed is:

1. A system for obtaining image depth information for at least one object in a scene, comprising:
    an imaging objective including a first portion for forming a first optical image of the scene, and a second portion for forming a second optical image of the scene, the first portion being different from the second portion;
    an image sensor for capturing the first and second optical images and generating respective first and second electronic images therefrom, the image sensor including an array of pixels containing all photosensitive pixels onboard the image sensor, each of the pixels being configured to detect light from a selected one of the first and second portions of the imaging objective, each of the pixels including:
  (a) a first pixel portion and a second pixel portion cooperating to produce a single electronic signal in response to light incident on the first pixel portion and the second pixel portion,
  (b) a lens for directing (i) light propagating from the first portion of the imaging objective toward the first pixel portion of the pixel and (ii) light propagating from the second portion of the imaging objective toward the second pixel portion of the pixel, and
  (c) a mask for blocking light from a non-selected one of the first and second portions of the imaging objective toward a corresponding one of the first pixel portion and the second pixel portion; and
a processing module for processing the first and second electronic images to determine the depth information.

2. The system of claim 1, the depth information comprising distance from the system to the at least one object.

3. The system of claim 1, the processing module comprising instructions for determining the depth information from spatial shift between the first and second electronic images.

4. The system of claim 3, the processing module further comprising calibration data, including correspondence between the spatial shift, a focus setting of the imaging objective, and the depth information, the instructions further comprising instructions for utilizing the calibration data to determine the depth information from the spatial shift between the first and second electronic images.

5. The system of claim 1, the imaging objective having an optical axis, the first and second portions of the imaging objective being located on opposing sides of the optical axis.

6. The system of claim 1, the imaging objective having adjustable focal length.

7. The system of claim 1, the imaging objective having fixed focal length.

8. The system of claim 7, the imaging objective having fixed position relative to the image sensor.

9. A method for obtaining image depth information for at least one object in a scene, comprising:
  forming first and second images of the scene, using respective first and second portions of an imaging objective, on a single image sensor including an array of pixels containing all photosensitive pixels onboard the single image sensor, each of the pixels being configured to detect light from a selected one of the first and second portions of the imaging objective, each of the pixels including:
    (a) a first pixel portion and a second pixel portion cooperating to produce a single electronic signal in response to light incident on the first pixel portion and the second pixel portion, and
    (b) a lens for directing (i) light propagating from the first portion of the imaging objective toward or the first pixel portion of the pixel and (ii) light propagating from the second portion of the imaging objective toward or the second pixel portion of the pixel;
  generating respective first and second electronic images from the first and second images, said generating including:
    (a) for a first subset of the plurality of pixels, blocking light from the second portion of the imaging objective to detect light only from the first portion of the imaging objective using the first pixel-portion of each pixel,
    (b) for a second subset of the plurality of pixels, blocking light from the first portion of the imaging objective to detect light only from the second portion of the imaging objective using the second pixel-portion of each pixel, and
    (c) generating the first and second electronic images from electronic signals from pixels in the first and second subsets, respectively; and
  determining the depth information from a spatial shift between the first and second electronic images.

10. The method of claim 9, the depth information comprising distance from the system to the at least one object.

11. The method of claim 9, the step of forming comprising simultaneously forming the first and second images of the scene, using the respective first and second portions of an imaging objective, on the single image sensor.

12. The method of claim 9, the step of determining comprising determining the depth information by utilizing calibrated correspondence between the spatial shift, a focus setting of the imaging objective, and the depth information.

13. The method of claim 12, the focus setting including a value of a parameter that controls an adjustable focusing property of the imaging objective.

14. The method of claim 9, further comprising adjusting a focusing property of the imaging objective to bring at least a portion of the scene inside depth of field.

15. The method of claim 9, the step of forming comprising forming the first and second images of the scene, using the respective first and second portions of the imaging objective located on opposing sides of optical axis of the imaging objective, on the single image sensor.

16. The method of claim 9, further comprising adjusting, based upon the spatial shift, a lens parameter to improve image focus.

* * * * *

UNITED STATES PATENT AND TRADEMARK OFFICE
CERTIFICATE OF CORRECTION

PATENT NO. : 9,633,441 B2
APPLICATION NO. : 14/299220
DATED : April 25, 2017
INVENTOR(S) : Chih Poh Pang et al.

It is certified that error appears in the above-identified patent and that said Letters Patent is hereby corrected as shown below:

In the Claims

Column 19, Line 20, Claim 1 delete "depth information" and insert --image depth information--;
    Line 21, Claim 2 delete "depth information" and insert --image depth information--;
    Line 24, Claim 3 delete "depth information" and insert --image depth information--;
    Line 30, Claim 4 delete "depth information" and insert --image depth information--;
    Line 32, Claim 4 delete "depth information" and insert --image depth information--;
Column 20, Line 26, Claim 9 delete "depth information" and insert --image depth information--;
    Line 28, Claim 10 delete "depth information" and insert --image depth information--;
    Line 35, Claim 12 delete "depth information" and insert --image depth information--;
    Line 37, Claim 12 delete "depth information" and insert --image depth information--.

Signed and Sealed this
Fourteenth Day of November, 2017

Joseph Matal
*Performing the Functions and Duties of the*
*Under Secretary of Commerce for Intellectual Property and*
*Director of the United States Patent and Trademark Office*